United States Patent
Shim

(10) Patent No.: US 9,265,688 B2
(45) Date of Patent: *Feb. 23, 2016

(54) DYNAMIC CONTROL RELAXING SYSTEMS AND METHODS

(71) Applicant: Youngtack Shim, Port Moody (CA)

(72) Inventor: Youngtack Shim, Port Moody (CA)

(*) Notice: Subject to any disclaimer, the term of this patent is extended or adjusted under 35 U.S.C. 154(b) by 34 days.

This patent is subject to a terminal disclaimer.

(21) Appl. No.: 14/023,745

(22) Filed: Sep. 11, 2013

(65) Prior Publication Data

US 2014/0012072 A1    Jan. 9, 2014

Related U.S. Application Data

(63) Continuation of application No. 12/318,664, filed on Jan. 6, 2009, now Pat. No. 8,550,983.

(51) Int. Cl.
*A61F 5/00* (2006.01)
*A61H 19/00* (2006.01)
(Continued)

(52) U.S. Cl.
CPC ............ *A61H 19/44* (2013.01); *A61H 19/30* (2013.01); *A61H 19/34* (2013.01); *A61H 23/00* (2013.01); *G06F 3/011* (2013.01); *A61H 2201/0153* (2013.01); *A61H 2201/1685* (2013.01); *A61H 2201/5048* (2013.01); *A61H 2201/5061* (2013.01); *A61H 2201/5071* (2013.01); *A61H 2201/5079* (2013.01); *A61H 2201/5084* (2013.01)

(58) Field of Classification Search
CPC .......... A61H 7/00; A61H 19/00; A61H 23/00
USPC .................................. 600/38–41; 601/46–135
See application file for complete search history.

(56) References Cited

U.S. PATENT DOCUMENTS

| | | | |
|---|---|---|---|
| 3,451,391 A | 6/1969 | Tavel | 128/36 |
| 3,504,665 A | 4/1970 | Bakunin et al. | 128/36 |

(Continued)

FOREIGN PATENT DOCUMENTS

| | | |
|---|---|---|
| EP | 2 047 833 A1 | 4/2009 |
| GB | 2 447 877 A | 1/2008 |

OTHER PUBLICATIONS

European Search Report dated Sep. 25, 2012, issued in corresponding European Patent Application No. 10729276.5-2318/2385817 PCT/KR2010000031.

(Continued)

*Primary Examiner* — John Lacyk
(74) *Attorney, Agent, or Firm* — Stein IP, LLC

(57) ABSTRACT

Various pelvic relaxing systems provide various stimuli to various portions of a pelvic structure including a clitoris, G spot, and other intravaginal portions defined inside or around a vaginal cavity. Such a system includes a body member with at least one unit (or part) capable of engaging with at least one portion of the structure, and at least one input unit for receiving user inputs and controlling an actuator member for providing various stimuli to various portions of the structure through various units (or parts) of the body member, without requiring an user to manipulate different switches or buttons during use. Various methods are presented to provide stimuli to various portions of the structure through various units of the body member without requiring the user to manipulate different switches or buttons. Various processes are presented to provide the above system and various members or units thereof.

22 Claims, 6 Drawing Sheets

(51) Int. Cl.
*G06F 3/01* (2006.01)
*A61H 23/00* (2006.01)

(56) References Cited

U.S. PATENT DOCUMENTS

| | | | |
|---|---|---|---|
| 3,598,106 A | 8/1971 | Buning | 128/2 R |
| 3,626,931 A | 12/1971 | Bysakh | 128/32 |
| 3,669,100 A | 6/1972 | Csanad | 128/32 |
| 3,991,751 A | 11/1976 | O'Rourke | 128/36 |
| 3,996,930 A | 12/1976 | Sekulich | 128/67 |
| 4,002,164 A | 1/1977 | Bradley | 128/67 |
| 4,033,338 A | 7/1977 | Igwebike | 128/36 |
| 4,050,449 A | 9/1977 | Castellana et al. | 128/2 S |
| 4,055,170 A | 10/1977 | Nohmura | 128/33 |
| 4,088,128 A | 5/1978 | Mabuchi | 129/52 |
| 4,162,675 A | 7/1979 | Kawada | 128/55 |
| 4,241,912 A | 12/1980 | Mercer et al. | 272/125 |
| 4,513,737 A | 4/1985 | Mabuchi | 128/52 |
| 4,574,791 A | 3/1986 | Mitchener | 128/79 |
| 4,722,327 A | 2/1988 | Harvey | 128/44 |
| 4,788,968 A | 12/1988 | Rudashevsky et al. | 128/41 |
| 4,790,296 A | 12/1988 | Segal | 128/51 |
| 4,825,853 A | 5/1989 | Iwamoto | 128/36 |
| 4,827,914 A | 5/1989 | Kamazawa | 128/34 |
| 4,834,075 A | 5/1989 | Guo et al. | 128/49 |
| 4,846,158 A | 7/1989 | Teranishi | 128/36 |
| 4,911,149 A | 3/1990 | Borodulin et al. | 128/32 |
| 5,063,911 A | 11/1991 | Teranishi | 128/32 |
| 5,067,480 A | 11/1991 | Woog et al. | 128/32 |
| 5,076,261 A | 12/1991 | Black | 128/44 |
| 5,085,207 A | 2/1992 | Fiore | 128/32 |
| 5,183,034 A | 2/1993 | Yamasaki et al. | 128/36 |
| 5,460,597 A | 10/1995 | Hopper | 601/84 |
| 5,470,303 A | 11/1995 | Leonard et al. | 601/84 |
| 5,676,637 A | 10/1997 | Lee | 601/15 |
| 5,690,603 A | 11/1997 | Kain | 600/38 |
| 5,690,604 A | 11/1997 | Barnett | 600/38 |
| 5,725,473 A | 3/1998 | Taylor | 600/38 |
| 5,851,175 A | 12/1998 | Nickell | 600/38 |
| 5,853,362 A | 12/1998 | Jacobs | 600/38 |
| 6,056,705 A | 5/2000 | Stigar-Brown | 601/84 |
| 6,142,929 A | 11/2000 | Padgett | 600/38 |
| 6,203,491 B1 | 3/2001 | Uribe | 600/38 |
| 6,402,710 B1 | 6/2002 | Hsu | 601/113 |
| 6,422,993 B1 | 7/2002 | Hudson | 600/38 |
| 6,540,667 B2 | 4/2003 | Hickman | 600/38 |
| 6,632,185 B2 | 10/2003 | Chen | 601/101 |
| 6,866,645 B2 | 3/2005 | Lee | 601/101 |
| 7,438,681 B2 | 10/2008 | Kobashikawa et al. | 600/38 |
| 7,452,326 B2 | 11/2008 | Fladl et al. | 600/38 |
| 7,828,717 B2 | 11/2010 | Lee | 600/38 |
| 8,550,983 B2 * | 10/2013 | Shim | 600/38 |
| 2003/0073881 A1 | 4/2003 | Levy | 600/38 |
| 2004/0034315 A1 | 2/2004 | Chen | 601/72 |
| 2004/0082831 A1 | 4/2004 | Kobashikawa et al. | 600/38 |
| 2004/0127766 A1 | 7/2004 | Chen | 600/38 |
| 2004/0132439 A1 | 7/2004 | Tyagi et al. | 455/419 |
| 2004/0147858 A1 | 7/2004 | Lee | 601/101 |
| 2005/0187431 A1 | 8/2005 | Hudson | 600/38 |
| 2005/0228218 A1 | 10/2005 | Skidmore et al. | 600/38 |
| 2008/0139980 A1 | 6/2008 | Fladl et al. | 601/70 |

OTHER PUBLICATIONS

U.S. Appl. No. 12/318,664, filed Jan. 6, 2009, Youngtack Shim.

* cited by examiner

DYNAMIC CONTROL RELAXING SYSTEMS AND METHODS

CROSS-REFERENCE TO RELATED APPLICATIONS

This application is a continuation of U.S. application Ser. No. 12/318,664, filed Jan. 6, 2009 in the U.S. Patent and Trademark Office, which claims an earlier invention date of the Disclosure Document entitled the same, deposited in the U.S. Patent and Trademark Office (the "Office") on Jan. 12, 2007 under the Disclosure Document Deposit Program (the "DDDP") of the Office, and which bears the Ser. No. 611,023. All disclosures of the document(s) named above are incorporated herein by reference.

BACKGROUND OF THE INVENTION

1. Field of the Invention

The present invention generally relates to pelvic relaxing systems for providing various stimuli to various portions of a pelvic structure such as, e.g., a clitoris, G spot, and various other intravaginal portions defined inside and/or around a vaginal cavity. More particularly, the present invention relates to a pelvic relaxing system which includes a body member including at least one part for engaging at least one portion of the pelvic structure and which includes at least one input unit capable of receiving various user inputs and controls its stimulator unit for providing similar or different stimuli to similar or different portions of the pelvic structure through the same part or different parts of the body member, without mandating an user to manually move the body member during use. The present invention also relates to various methods of providing stimuli to the same portion or different portions of the structure through the same part or different parts of such a body member without requiring the user to manually move the body member. The present invention further relates to various processes for providing the above system and various members and/or units thereof.

2. Description of the Related Art

A vaginal anatomy typically includes a vaginal entry and a vaginal wall, where such an entry defines an orifice therethrough, while the wall includes muscles and defines a vaginal cavity which extends inwardly from the entry and which is also bound by such muscles. The entry forms a clitoris thereon, and a paraurethral gland of an urethral sponge of a clitoris (also called the Grafenberg spot or G spot) is believed to be defined on the wall. The vaginal wall is formed essentially of two sets of muscles, the former extending longitudinally while the latter encircling the vagina. These muscles are specifically termed as "pubococygenus" and "levator ani" and are located immediately adjacent to the vagina. These muscles have general appearance of a hammock with its two ends connected to the sides of a pelvis. In particular, the pubococygenus is basically a sphincter muscle which passes through a middle third of the vagina and runs in a circular band, with a ring-like ridges forming a part of a urethra and anus. For simplicity of illustration, this vaginal anatomy is to be referred to as "a pelvic structure," the vaginal entry as an "entry," and the vaginal wall as a "wall." In addition, such a pelvic structure is referred to as the "standard pelvic structure" or simply the "pelvic structure" hereinafter for simplicity of illustration, unless otherwise specified.

Among devices currently available in the market for enhancing sexual functioning are dildos, vaginal exercise bars, and prostate stimulators. These devices generally provide stimuli from friction upon manipulation of their stimulators or by pressure due to distension of the pelvic cavity effected by a volume of such stimulators.

For example, manual pelvic relaxing devices have been proposed in various configurations as disclosed in various prior art such as, e.g., U.S. Pat. No. 3,996,930 to Sekulich, U.S. Pat. No. 5,690,603 to Kain, U.S. Pat. No. 5,690,604 to Barnett, U.S. Pat. No. 5,853,362 to Jacobs, U.S. Pat. No. 6,203,491 to Uribe, U.S. Pat. App. Pub. No. 2005/0187431 by Hudson, U.S. Pat. App. Pub. No. 2005/0228218 by Skidmore et al., U.S. Pat. No. 6,540,667 to Hickman, and the like. Being manual, users have to manually move such devices in and out of the pelvic cavity and/or around the pelvic opening.

In order to overcome inconvenience thereof, various automatic mechanisms have been added to the pelvic relaxation devices. In one class of examples, electric motors or electromagnetic vibration mechanisms have been incorporated to various automatic devices for effecting vibration as disclosed in various prior art such as, e.g., U.S. Pat. No. 3,451,391 to Tavel, U.S. Pat. No. 3,504,665 to Bakunin et al., U.S. Pat. No. 3,626,931 to Bysakh, U.S. Pat. No. 3,669,100 to Csanad, U.S. Pat. No. 3,991,751 to O'Rourke, U.S. Pat. No. 4,788,968 to Rudashevsky et al., U.S. Pat. No. 5,067,480 to Woog et al, U.S. Pat. No. 6,056,705 to Stigar-Brown, U.S. Pat. Appl. Pub. 2004/0034315 to Chen, U.S. Pat. Appl. Pub. 2004/0127766 to Chen, and the like.

In another class of example, automatic pelvic relaxing devices have used various mechanisms of converting rotational movements generated by such electric motors into translational movements for effecting horizontal and/or vertical translation of their stimulators. Several examples of such prior art include U.S. Pat. No. 4,722,327 to Harvey, U.S. Pat. No. 4,790,296 to Segal, U.S. Pat. No. 5,076,261 to Black, U.S. Pat. No. 5,725,473 to Taylor, U.S. Pat. No. 6,142,929 to Padgett, U.S. Pat. No. 6,422,993 to Hudson, U.S. Pat. No. 6,866,645 to Lee, and U.S. Pat. Appl. Pub. 2004/0147858

Various automatic pelvic relaxing devices have also used various mechanisms for converting rotational movements generated by such electric motors into lateral movements for effecting horizontal translation of their stimulators along a direction generally normal to axes of such stimulators. Several examples of such prior art are U.S. Pat. No. 5,460,597 to Hopper, U.S. Pat. No. 5,470,303 to Leonard et al., and U.S. Pat. No. 5,851,175 to Nickell.

Other therapeutic devices, although developed for various purposes other than pelvic relaxing, seem to have been used as alternatives as such conventional pelvic relaxing devices. In one class of examples, various manual or vibration devices have been disclosed to train or heal pelvic muscles as exemplified in U.S. Pat. No. 3,598,106 to Buning, U.S. Pat. No. 4,241,912 to Mercer et al., and U.S. Pat. No. 4,574,791 to Mitchener. In another class of examples, various devices have been developed for massaging various portions of a human body as disclosed in U.S. Pat. No. 4,055,170 to Nohmura, U.S. Pat. No. 4,825,853 to Iwamoto et al., U.S. Pat. No. 4,846,158 to Teranishi, U.S. Pat. No. 4,911,149 to Borodulin et al., U.S. Pat. No. 5,063,911 to Teranishi, and the like. In another class, massage devices have also been devised to provide translational movements as disclosed in U.S. Pat. No. 4,002,164 to Bradley, U.S. Pat. No. 5,085,207 to Fiore, U.S. Pat. No. 5,676,637 to Lee, and the like. In another class of examples, various devices have also been arranged to provide rotating, tapping, swinging and/or swiveling movements as described in U.S. Pat. No. 4,162,675 to Kawada, U.S. Pat. No. 6,632,185 to Chen, U.S. Pat. No. 4,088,128 to Mabuchi, U.S. Pat. No. 4,513,737 to Mabuchi, U.S. Pat. No. 4,827,914 to Kamazawa, U.S. Pat. No. 4,834,075 to Guo et al., U.S. Pat. No. 5,183,034 to Yamasaki et al., and U.S. Pat. No. 6,402,710 to Hsu. A vacuum device of U.S. Pat. No. 4,033,338 to Igwebike as well as a balloon device of U.S. Pat. No. 4,050,449 to Castellana et al. have also been proposed.

Regardless of their detailed mechanisms and/or movements effected thereby, all of these prior art devices suffer from common drawbacks. Excluding those manual ones, typical automatic devices consist of main modules and control modules which operatively couple with the main modules by wire for delivering electric power and control signals. Such wire, however, tends to be easily tangled and damaged. To overcome this defect, modern automatic pelvic relaxing device are fabricated as single unitary articles each with a main body and a handle which fixedly couples with a top part of the main body. The main body is generally designed to be inserted into the pelvic cavity, whereas the handle is shaped and sized to provide a grip for the user and also incorporates therein various control buttons. Accordingly, the handle consists of a space to form the grip and another space for such buttons. In order to avoid providing an inadvertently long device, however, a part of the handle closer to the main body is recruited to define the grip, whereas the rest of the handle houses the control buttons. It is to be appreciated, however, that all control buttons of conventional automatic devices are either on/off switches or speed control switches, where the on/off switches turn on and off the entire device or a specific movement thereof, and the speed control switches control a speed of the specific movement. In addition, such switches are typically designed to be activated and deactivated each time the user presses or touches them. Accordingly, when the user inadvertently touches any of such on/off and control switches during use, the device may be accidentally turned off, change speeds, and the like. In order to avoid such inadvertent operation, the control buttons have been incorporated as far away from the grip space of the handle, which in turn causes the very inconvenience of requiring the user to change the grip or to move his or her hand to manipulate the control buttons during operation when the user wants to change the speed of movement.

Accordingly, there is an urgent need for a pelvic relaxing system capable of effecting different movements (or same movement) of different parts (or same part) of a body member of such a system to provide different (or same) stimuli to different portions (or same portion) of such a pelvic structure without requiring the user to move his or her hand or without requiring such an user to change a grip. It then follows that the pelvic relaxing system inevitably requires an input unit which enables the user to supply different user inputs thereto without mandating the user to move his or her hand and without changing his or her grip, a control member which monitors various temporal and/or spatial patterns of such different user inputs, and an actuator member which effects various movements of a single part or multiple parts of the body member in desirable temporal and/or spatial patterns in response to such user inputs.

SUMMARY OF THE INVENTION

The present invention generally relates to pelvic relaxing systems for providing various stimuli to various portions of a pelvic structure such as, e.g., a clitoris. G spot, and various other intravaginal portions defined inside and/or around a vaginal cavity. More particularly, the present invention relates to a pelvic relaxing system which includes a body member including at least one part for engaging at least one portion of the pelvic structure, which includes at least one actuator member for effecting the same or different movements of the same or different parts of the body member, and which includes at least one input unit capable of receiving various user inputs and manipulating its actuator member in order to effect the same or different movements of the same or different parts, thereby providing the same or different stimuli to the same or different portions of the pelvic structure through such same or different parts, without mandating an user to manually move the body member during relaxing. Such a system is preferably designed to allow its user to manipulate the actuator member as well as to effect desirable movements of the same or different parts of the body member by supplying the user inputs to a specific input unit of the system during use while holding the system with his or her hand without having to change his or her grip or to move his or her hand with respect to the body member.

The present invention also relates to various methods of providing various stimuli to the above portions of the pelvic structure. More particularly, the present invention relates to various methods of providing the same or different stimuli to the same or different portions of the pelvic structure through the same or different parts of the body member without requiring the user to manually move the body member with respect to the structure. The present invention relates to various methods of receiving different user inputs by a specific input unit and manipulating a specific actuator member to effect the same or different movements of the same or different parts of the body member so as to provide the same or different stimuli to the same or different portions of the pelvic structure in response to such user inputs. The present invention further relates to various processes for providing such systems and various members and/or units thereof.

Therefore, one objective of the present invention is to provide a pelvic relaxing system which allows its user to control various dynamic features of movements of its actuator member or stimulator unit and/or a configuration of its body member through its specific input unit as a response to different user inputs without mandating the user to change the grip and/or to move his or hand during use.

Another objective of the present invention is to provide a pelvic relaxing system which allows its user to contact a specific portion of the pelvic structure with different parts of the system which are spaced apart axially and/or angularly with respect to a longitudinal axis of such a system through supplying different user inputs to its specific input unit without requiring the user to manually move or rotate the system onto the portion of the structure and without having to change the grip or move his or her hand.

Another objective of the present invention is to provide a pelvic relaxing system which allows its user to contact different portions of the pelvic structure with a specific part of the system through supplying different user inputs to its specific input unit without requiring the user to manually move or rotate the system onto such portions of the structure and without having to change the grip or move his or her hand.

Another objective of the present invention is to provide a pelvic relaxing system which allows its user to individually and/or simultaneously control contacts between different portions of the pelvic structure and different parts of the system through supplying different user inputs to its specific input unit without requiring the user to manually move or rotate the system onto such portions and without having to change the grip or move his or her hand.

Another objective of the present invention is to provide such a system with a control member which receives different user inputs through at least a substantially identical area of its specific input unit and which controls various dynamic features of movements of the system and/or a configuration of the system in response to various dynamic patterns of such user inputs without requiring the user to manually move or rotate the system and without having to change the grip or move his or her hand.

Another objective of the present invention is to provide such a system with a control member which monitors an amplitude of the user input with its specific input unit and controls various dynamic features of movement of the system, a type of the movement, and/or a configuration of the system in response to temporal pattern and/or spatial pattern of such an amplitude without requiring the user to manually move or rotate the system and without having to change the grip or move his or her hand.

Another objective of the present invention is to provide such a system with a control member which monitors a direction of the user input with its specific input unit and controls various dynamic features of movement of the system, a type of such movement, and/or a configuration of the system in response to temporal pattern and/or spatial pattern of such a direction without requiring the user to manually move or rotate the system and without having to change the grip or move his or her hand.

Another objective of the present invention is to provide such a system with a control member which monitors a duration of the user input with its specific input unit and controls various dynamic features of movement of the system, a type of the movement, and/or a configuration of the system in response to temporal pattern and/or spatial pattern of such a duration without requiring such an user to manually move or rotate the system and without having to change the grip or move his or her hand.

Another objective of the present invention is to provide such a system with a control member which monitors various dynamic patterns of the user input with its specific input unit and then actuate a specific actuator member only as long as the user supplies such an user input, with or without any default movement of the system which may be controlled by another input unit regardless of the user input to the specific input unit.

Another objective of the present invention is to arrange the above input unit to vary its electric resistance in response to various dynamic patterns of the user input and to generate different signals depending upon the electric resistance such that a control member controls various dynamic features of movement of the system, a type of the movement, and/or a configuration of the system in response to such signals without requiring the user to manually move or rotate the system and without having to change the grip or move his or her hand.

Another objective of the present invention is to use a joystick-type input unit, a touch pad-type input unit, a trackball-type input unit, and other direction-sensitive input units in order to monitor such an amplitude, direction or duration of the user input so that a control member controls various dynamic features of movement of the system, a type of the movement, and/or a configuration of the system in response to such signals without requiring the user to manually move or rotate the system as well as without having to change the grip or move his or her hand.

Another objective of the present invention is to provide a compound input unit which receives the user input through at least a substantially identical area but generates different signals as the user input is applied thereto along a horizontal, vertical, and/or angular direction such that a control member controls various dynamic features of movement of such a system, a type of such movement, and/or a configuration of the system as a response to the signals without requiring the user to manually move or rotate the system and without having to change the grip or move his or her hand.

Another objective of the present invention is to provide an array of input units each of which is capable of monitoring such amplitudes, directions, and/or durations of the user inputs and at least two of which are disposed close to each other and horizontally, vertically or angularly around the handle of the system so that the user supplies different user inputs to one or more of the input units and that a control member controls various dynamic features of movement of such a system, a type of such movement, and/or a configuration of the system in response to the signals without requiring the user to manually move or rotate the system and without having to change the grip or move his or her hand.

Another objective of the present invention is to incorporate a specific input unit into a grip area of the system so that the user may supply different user inputs thereto through a hand or a finger(s) without requiring the user to manually move or rotate such a system and without having to change the grip or move his or her hand.

Another objective of the present invention is to provide a sensor unit which is incorporated in a part of the system insertable into the pelvic cavity so that the user applies the user input into such a sensor unit not with his or her finger and/or hand but by contacting or abutting the structure with the sensor unit disposed in the insertable part of the system, without requiring the user to manually move or rotate the system and without having to change the grip or move his or her hand.

Another objective of the present invention is to incorporate such a system with an input unit or sensor unit as well as a power supply member in a waterproof configuration such that the user may clean and sanitize the entire system without compromising functionality of the system by water leaked thereinto.

Various aspects and/or embodiments of various systems, methods, and/or processes of this invention will now be described, where such aspects and/or embodiments only represent different forms. Such systems, methods, and/or processes of this invention, however, may also be embodied in many other different forms and, therefore, should not be limited to the aspects and/or embodiments which are set forth herein. Rather, various exemplary aspects and/or embodiments described herein are provided so that this disclosure will be thorough and complete, and fully convey the scope of the present invention to one of ordinary skill in the art. It is to be understood that various movements and mechanisms therefor as well as various control algorithms of the prior art devices as described in the above Background of the Invention are to be incorporated herein in their entireties by reference.

In one aspect of the present invention, a pelvic relaxing system may be fabricated to provide tactile stimuli onto at least a portion of a pelvic structure based upon at least one dynamic pattern of an user input applied to at least a part of the system by an user, where the pelvic structure includes an entry and a wall, where the entry defines an orifice therethrough, while the wall includes muscles and defines an internal cavity extending inwardly from the entry and bound by the muscles. Such a pelvic structure will be referred to as the "standard pelvic structure" or simply the "pelvic structure" hereinafter for simplicity of illustration, unless otherwise specified.

In one exemplary embodiment of this aspect of the invention, a system may include at least one body member, at least one actuator member, and at least one control member. The body member may be arranged to include at least one first part and at least one second part, the first part for contacting the portion of the pelvic structure when engaged therewith and the second part for providing a grip to the user. Such a body member is to be referred to as the "body member of the first type" hereinafter for ease of illustration. The actuator member may be arranged to effect at least one movement of the first part of the body member for providing the stimuli to the portion of the structure by the movement. Such an actuator member is to be referred to as the "actuator member of the first type" hereinafter for ease of illustration.

In one example, the control member may be arranged to include a single input unit disposed in the second part and monitoring the dynamic pattern of the user input and to also change at least one of a dynamic feature of the movement and a configuration of the body member through the actuator member in response to the dynamic pattern, examples of which may include, but not be limited to, an amplitude of the user input, its direction, its acceleration, its frequency, its duration, and a compound value obtained by at least one mathematical manipulation of at least one of such amplitude, direction, frequency, duration, and acceleration.

In another example, the control member may be arranged to have a single input unit disposed in the second part and monitoring force applied thereto by the user and to further change at least one of a dynamic feature of the movement and a configuration of the body member by the actuator member in response to the dynamic pattern, examples of which may include, but not be limited to, an amplitude of the force, its direction, its frequency, its duration, and a compound value obtained through at least one mathematical manipulation of at least one of the amplitude, direction, frequency, and duration.

In another example, the control member may be arranged to include a single input unit disposed in the second part and monitoring a displacement, velocity, and/or acceleration thereof effected by the user and to change at least one of a dynamic feature of the movement and a configuration of the body member by the actuator member in response to the dynamic pattern, examples of which may include, but not be limited to, an amplitude of such displacement, velocity, and/or acceleration, duration thereof, direction thereof, frequency thereof, and a compound value which may be obtained through at least one mathematical manipulation of at least one of such amplitude, duration, direction, and frequency.

In another example, the control member may be arranged to have a single input unit disposed in the second part and monitoring a mechanical contact, an electrical contact, a magnetic contact, and/or an optical contact between the input unit and user and to change at least one of a dynamic feature of the movement and a configuration of the body member through the actuator member as a response to the dynamic pattern, examples of which may include, but not be limited to, a duration of such at least one of the contacts, its frequency, its spatial sequence, its temporal sequence, and a compound value obtained through at least one mathematical manipulation of at least one of the duration, frequency, and sequences.

In another exemplary embodiment of this aspect of the invention, a system may include at least one body member of the first type, at least one actuator member of the first type, and also at least one control member.

In one example, the control member may include at least one sensor unit disposed in the first part and monitoring the dynamic pattern of the user input applied thereto through the pelvic structure of the user. The control member may also be arranged to change at least one of a dynamic feature of the movement and a configuration of the body member through the actuator member as a response to the dynamic pattern, examples of which may be, but not be limited to, an amplitude of the user input, its frequency, its acceleration, its direction, its duration, and a compound value which is obtained by at least one mathematical manipulation of at least one of the amplitude, frequency, acceleration, direction, and duration.

In another example, the control member may have at least one sensor unit disposed in the first part and monitoring force applied thereto through the pelvic structure of the user. The control member may also be arranged to vary at least one of a dynamic feature of the movement and a configuration of the body member through the actuator member as a response to the dynamic pattern, examples of which may be, but not be limited to, an amplitude of the force, its direction, its frequency, its duration, and a compound value obtained through at least one mathematical manipulation of at least one of such amplitude, direction, frequency, and duration.

In another example, the control member may have at least one sensor unit disposed in the first part and sensing torque applied thereto through the pelvic structure of the user. The control member may also be arranged to vary at least one of a dynamic feature of the movement and a configuration of the body member through the actuator member as a response to the dynamic pattern, examples of which may be, but not be limited to, an amplitude of the torque, its direction, its frequency, its duration, and a compound value obtained through at least one mathematical manipulation of at least one of such amplitude, direction, frequency, and duration.

In another example, the control member may have at least one sensor unit disposed in the first part and monitoring a displacement, velocity, and/or acceleration thereof effected through the pelvic structure of the user. The control member may also be arranged to change at least one of a dynamic feature of the movement and a configuration of the body member through the actuator member as a response to the dynamic pattern, examples of which may include, but not be limited to, an amplitude of the displacement, velocity, and/or acceleration, duration thereof, direction thereof, frequency thereof, and a compound value obtained through at least one mathematical manipulation of at least one of such amplitude, duration, direction, and frequency.

In another example, the control member may have at least one sensor unit disposed in the first part and monitoring at least one of a mechanical contact, an electrical contact, a magnetic contact, and an optical contact between the sensor unit and the pelvic structure of the user. The control member may also be arranged to vary at least one of a dynamic feature of the movement and a configuration of the body member through the actuator member as a response to the dynamic pattern, examples of which may include, but not be limited to, a duration of such at least one of the contact, its frequency, its spatial sequence, its temporal sequence, and a compound value which is obtained through at least one mathematical manipulation of at least one of such duration, frequency, and sequences.

In another example, the control member may have at least one sensor unit disposed in the first part and monitoring a deflection thereof effected by the user through the pelvic structure of the user. The control member may also be arranged to vary at least one of a dynamic feature of the movement and a configuration of the body member through the actuator member as a response to the dynamic pattern, examples of which may be, but not be limited to, an amplitude of the deflection, its direction, its frequency, its duration, and a compound value obtained by at least one mathematical manipulation of at least one of such amplitude, direction, frequency, and duration.

Embodiments of this aspect of the invention may include one or more of the following features.

The system may be arranged to allow the user to reach and to manipulate the input unit with at least one finger thereof while simultaneously holding and/or manipulating the second part with a hand thereof during use of the system without having to move the hand with respect to the second part. The control member may include at least another input unit in addition to the single input unit, where the another input unit may receive similar or different user inputs, may be disposed adjacent to or spaced away from the single input unit, and the like. The input unit may receive the user input through at least a substantially identical part thereof to actuate the actuator member and/or stimulator units thereof, to effect the movements, and to provide the stimuli to the portions. The system may be arranged to allow the user to provide the user input by contacting and/or abutting the sensor unit with the portion of the pelvic structure while holding and manipulating the second part with a hand thereof during use of the system without having to move a finger thereof. The input unit may move and/or operate between the states at least substantially continuously or intermittently. The input unit and/or switch may be any of a conventional joystick, touch pad, track ball, and other switches which may be arranged to operate or move horizontally and/or vertically while operating between the states. Such a joystick, touch pad, and/or track ball may further be arranged to move horizontally and/or vertically. The control member may also include additional switches such as, e.g., conventional on/off switches, conventional speed control switches, and the like.

The portion of the pelvic structure may correspond to a clitoris of the entry, a G spot along the wall, other portions of the wall, and the like. The parts may be defined in its head, trunk, and/or base of the body member. The parts may be identical, disposed close to or apart from each other, and the like. The parts may be designed as a clitoral stimulator disposed in the base of the body member, as a G spot stimulator disposed in one of the trunk and base of the body member, and the like.

Such dynamic pattern of the user input may include at least one of its temporal pattern and its spatial pattern, where the temporal pattern may be, but not be limited to, a duration of the user input, its frequency, and its temporal sequence, where the spatial pattern may include, but not be limited to, at least one of an amplitude of the user input (or displacement), its direction, and its types, and where examples of the type may include, but not be limited to, vibration, horizontal and/or vertical translation, angular rotation, rotation about a center of rotation and/or an axis of rotation defined in or on the body member, swiveling, tapping, deformation, and the like.

The user input may be a presence and/or absence of at least one of the contacts between the user and input unit regardless of such dynamic pattern of the force accompanying such contact. The sensor unit may be incorporated into the first part of the body member which may be a head, a trunk, and/or a base thereof. The sensor unit may be incorporated into the second part of the body member.

The dynamic feature of the movement may include at least one of its temporal feature and its spatial feature, where the temporal feature may include, but not be limited to, at least one of a duration of the movement, its frequency, and its temporal sequence, where the spatial feature may include, but not be limited to, at least one of an amplitude of such movement (or displacement), its direction, and its type, and where examples of such types may include, but not be limited to, vibration, horizontal and/or vertical translation, transverse translation, angular rotation, rotation about a center of rotation and/or an axis of rotation defined in the body member, swiveling, tapping, deformation, and the like.

The temporal feature may include one or multiple movements of a preset part or different parts of the body member which may be arranged in the sequence which may be a preset sequence and/or a sequence which may be at least partially decided by the user input. Changing the temporal feature may not include turning on and off the actuator member and/or stimulator units thereof or its reverse (i.e., turning off and on the actuator member and/or its stimulator units) and may not include changing a speed of the movement between at least two substantially identical portions of the pelvic structure. The spatial feature may include one or multiple movements of a preset part or different parts of such a body member while contacting a preset portion or different portions of the pelvic structure. Changing the spatial feature may not include moving the actuator member and/or its stimulator units in either its on or off states or its reverse (i.e., either its off or on states of the actuator member or its stimulator units). Such a configuration may include a length of the body member, a diameter thereof, a curvature thereof, a surface texture thereof, and the like. Changing the configuration may not include changing a length of the first part inserted in the cavity of the pelvic structure. Such mathematical manipulation may be a differentiation of at least one of such dynamic pattern with respect to time, an integration of such dynamic pattern over time, an arithmetic or geometric averaging of such dynamic pattern with or without weighting factors, and so on. In addition, changing the spatial feature may not include moving the actuator member (or stimulator unit) only in an opposite direction at the same speed and/or with the same type of movement.

It is appreciated that various features described in the above six paragraphs will be referred to as the "standard features" hereinafter for simplicity of illustration. It is further appreciated that all of these features apply to all pelvic relaxing systems, their members, and/or their units described in this invention unless otherwise specified.

In another aspect of the present invention, another pelvic relaxing system may include at least one input unit for receiving an user input and may also be arranged to provide tactile stimuli to at least a portion of the standard pelvic structure.

In one exemplary embodiment of this aspect of the invention, a system may include at least one body member, at least one actuator member, and at least one control member. The body member may be arranged to have at least two parts capable of contacting different portions of the pelvic structure when engaged therewith. The actuator member may be arranged to have at least two stimulator units one of which may be arranged to effect a first movement of one of the parts and to provide one of the stimuli to one of the portions through the first movement, while another of which may be arranged to effect a second movement of another of the parts and to provide another of the stimuli to another of the portions through the second movement. The control member may include a single input unit which may be arranged to receive the user input, to form operative couplings with such stimulator units, to operate between at least three (or two) states in response to the user input, and to actuate one of the stimulator units for effecting the first movement in one of the states or another of the stimulator units for effecting the second movement in another of the states depending upon the user input.

In another exemplary embodiment of this aspect of the invention, a system may include at least one body member of the second type, at least one actuator member, and at least one control member. The actuator member may be arranged to include at least one stimulator unit which may be arranged to effect at least two movements of the part, to provide a first of the stimuli to one of the portions by a first of the movements, and to provide a second of the stimuli to another of the portions by a second of the movements without manually moving the body member. The control member may have a single input unit which may be arranged to receive the user input, to operate between at least three (or two) states in response to the user input, to form operative coupling with the stimulator unit, and to actuate the stimulator unit for effecting the first of the movements in a first of the states or the second of the movements in a second of the states depending upon the user input.

In another exemplary embodiment of this aspect of the invention, a system may include at least one body member, at least one actuator member, and at least one control member. The body member may be arranged to define at least two parts capable of contacting the portion of the pelvic structure one at a time when engaged therewith. The actuator member may be arranged to include at least one stimulator unit which may be arranged to effect a first movement of a first of the parts for providing a first of the stimuli to the portion by the first movement or to effect a second movement of a second of the parts for providing a second of the stimuli to the portion by the second movement without manually moving the body member. The control member may include a single input unit which may be arranged to receive the user input, to form operative coupling with the stimulator unit, to move between at least three (or two) states in response to the user input, and to actuate the stimulator unit for providing the first of the stimuli to the portion by the first of the parts in one of the states or for providing the second of the stimuli to the portion by the second of the parts in another of the states depending on the user input.

In another exemplary embodiment of this aspect of the invention, a system may include at least one body member of the second type, at least one actuator member, and at least one control member. The actuator member may be arranged to include at least one stimulator unit which may be capable of disposing the part in either of such portions one at a time without manually moving the body member. The control member may have a single input unit which may be arranged to receive the user input, to form operative coupling with the stimulator unit, to operate between at least three (or two) states in response to the user input, and then to actuate the stimulator unit for providing the stimuli to one of the portions by disposing the part therearound in one of the states or for providing the stimuli to another of the portions by disposing the part therearound in another of the states depending upon the user input.

In another aspect of the present invention, another pelvic relaxing system may be arranged to provide tactile stimuli to at least a portion of the standard pelvic structure in response to force and/or torque applied to at least a part of the system.

In one exemplary embodiment of this aspect of the invention, such a system may have at least one body member of the first type, at least one actuator member of the second type, and also at least one control member. The control member may include a single input unit which may be disposed in the second part and arranged to form operative coupling with the stimulator unit, to sense dynamic pattern of the force and/or torque, to move between at least three (or two) states in response to the dynamic pattern, and to actuate the stimulator unit for effecting a first of the movements while providing one of the stimuli in one of the states or for effecting a second of the movements while providing another of the stimuli in another of the states based on the dynamic pattern examples of which may be, but not be limited to, an amplitude of the force or torque, its frequency, its direction, its duration, displacement thereof caused by the force (or torque), deformation thereof caused thereby, and a compound value which may be obtained through at least one mathematical manipulation of at least one of the amplitude, frequency, direction, duration, displacement, and deformation.

In another exemplary embodiment of this aspect of the invention, a system may include at least one body member, at least one actuator member, and at least one control member. The body member may have at least one part capable of contacting such a portion of the pelvic structure when engaged therewith. The actuator member may include at least one stimulator unit which may be arranged to effect at least two different movements of the part for providing the stimuli to the portion. The control member may include at least one sensor unit which may be disposed in (or around) the part and also arranged to form operative coupling with the stimulator unit, to receive the force and/or torque through the pelvic structure, to monitor dynamic pattern of the force and/or torque, to operate between at least three (or two) states in response to the above dynamic pattern, and to actuate the stimulator unit for effecting a first of the movements and providing one of the stimuli in one of the states or for effecting a second of the movements and providing another of the stimuli in another of the states based on the dynamic pattern examples of which may include, but not be limited to, an amplitude of the force and/or torque, its frequency, its direction, its duration, displacement thereof caused by such force or torque, deformation thereof caused by the force or torque, and a compound value which is obtained through at least one mathematical manipulation of at least one of the amplitude, frequency, direction, duration, displacement, and deformation.

Embodiments of the above two aspects of the present invention may also include one or more of the following features.

First of all, the above standard features all apply to various systems, their members, and their units of the above two aspects of this invention. The coupling may be an electric coupling, a magnetic coupling, a mechanical coupling, and the like. Such first and second movements may be of the same, similar or different types and/or may be along the same, similar or different directions. Such first and second movements may not be those of the same types having different speeds and effected by the same stimulator unit, may not be those of turning on and off the same stimulator unit, and so on. The first and second movements may not be those for starting and stopping the stimulator unit. Changing the dynamic pattern may not include turning on and off the stimulator unit and/or turning off and on the stimulator unit, may not include changing a speed of the movement between at least two substantially identical portions of the pelvic structure, and the like. Changing the dynamic pattern may not include moving the stimulator unit between its on and off states or its reverse (i.e., turning off and on such an actuator member). The stimulator units may be designed to provide the stimuli to a clitoris of the entry, a G spot on the wall, other portions of the wall, and the like. The control member may also change at least one configuration of the body member in response to the dynamic pattern of the user input.

It is appreciated that various features described in the previous paragraph is to be referred to as the "auxiliary features" hereinafter for simplicity of illustration. It is also appreciated that all of these auxiliary features also apply to all pelvic relaxing systems, their members, and/or their units described in this invention unless otherwise specified.

In another aspect of the present invention, another pelvic relaxing system may be arranged to provide tactile stimuli to at least one portion of the standard pelvic structure in response to at least one dynamic pattern of an user input applied to at least a part of the system.

In one exemplary embodiment of this aspect of the invention, a system may include at least one body member, at least one actuator member, and at least one control member. The body member may be arranged for contacting the pelvic structure when engaged therewith. This body member will be referred to as the "body member of the third type" hereinafter for simplicity of illustration. The actuator member may be arranged to include at least two stimulator units, a first of which may be arranged to effect a first movement of the body member for providing one of the stimuli to the pelvic structure by the first movement, whereas a second of which may be arranged to effect a second movement of the body member for providing another of the stimuli to the pelvic structure by the second movement. The control member may have a single input unit which may be arranged to receive the user input, to form operative couplings with the stimulator units, to operate between at least three (or two) states as a response to the dynamic pattern, and to actuate the first of the stimulator units as moved to one of the states or the second of the stimulator units when moved to another of the states depending upon the dynamic pattern.

In another exemplary embodiment of this aspect of the invention, a system may include at least one body member of such a third type, at least one actuator member, and at least one control member. The actuator member may be arranged to include a single stimulator unit and at least two driver units each of which may operatively couple with the stimulator unit. The stimulator unit may be arranged to effect a first movement of the body member for providing one of the stimuli to the pelvic structure by the first movement when actuated by a first of the driver units and effect a second movement of the body member for providing another of the stimuli to the pelvic structure when actuated by a second of the driver units. The control member may have at least one switch which may be arranged to receive the user input, to define operative couplings with the driver units, to operate between at least three (or two) states in response to the dynamic pattern, and then to actuate the stimulator unit with a first of the driver units when moved to one of the states or to actuate the stimulator unit with a second of the driver units when moved to another of the states depending on the dynamic pattern.

In another exemplary embodiment of this aspect of the invention, a system may include at least one body member of such a third type, at least one actuator member, and at least one control member. The actuator member may be arranged to have a stimulator unit, a driver unit, as well as at least two transmission units each of which may be arranged to operatively couple the stimulator unit with the driver unit for effecting different movements of the body member. The stimulator unit may be arranged to effect a first of the movements and providing one of such stimuli to the pelvic structure through the first movement as coupled to the driver unit by a first of the transmission units or to effect a second of the movements and providing another of the stimuli to the pelvic structure by the second movement as coupled to the driver unit through a second of the transmission units. The control member may have at least one switch which may be arranged to receive the user input, to form operative couplings with the driver and transmission units, to operate between at least three (or two) states in response to the dynamic pattern, and then to operatively couple the driver unit with the stimulator unit through a first of the transmission units when moved to one of the states or through a second of the transmission units when moved to another of the states based upon the dynamic pattern.

In another aspect of the present invention, another pelvic relaxing system may be arranged to provide tactile stimuli to at least one portion of the standard pelvic structure based upon at least one dynamic pattern of force applied to at least a part of the system by an user.

In one exemplary embodiment of this aspect of the invention, a system may include at least one body member of the first type, at least one actuator member of the third type, and at least one control member. In one example, the control member may have at least one input unit which may be installed in the second part and also arranged to receive the force applied thereto by a hand of the user while sensing its direction, to form operative coupling with the stimulator unit, to operate between at least three (or two) states in response to the direction, and to actuate the stimulator unit for generating a first and a second of the movements in each of the states depending upon the direction. In another example, the control member may have at least one sensor unit which may be installed in the first part and also arranged to receive the force applied thereto through the pelvic structure of the user while sensing its direction, to form operative coupling with the stimulator unit, to operate between at least three (or two) states in response to the direction, and to actuate the stimulator unit for generating a first and a second of the movements in each of the states depending upon the direction.

In another exemplary embodiment of this aspect of the invention, a system may include at least one body member of the first type, at least one actuator member of the third type, as well as at least one control member. In one example, the control member may have at least one input unit which may be placed in the second part and arranged to receive the force applied thereto by a hand of the user while sensing its amplitude, to form operative coupling with the stimulator unit, to operate between at least three (or two) states in response to the amplitude, and to actuate the stimulator unit for effecting a first and a second of the movements in one and another of the states, respectively, depending upon the amplitude. In another example, the control member may have at least one sensor unit which may be incorporated into the first part and arranged to receive the force applied thereto through the pelvic structure of the user while sensing its amplitude, to form operative coupling with the stimulator unit, to operate between at least three (or two) states in response to such an amplitude, and to actuate the stimulator unit for generating a first and a second of the movements in each of the states depending upon the amplitude.

In another aspect of the present invention, another pelvic relaxing system may be arranged to provide tactile stimuli to at least one portion of the standard pelvic structure based upon at least one dynamic pattern of contact between at least a part of the system and an user.

In one exemplary embodiment of this aspect of the invention, a system may include at least one body member of the first type, at least one actuator member of the third type, and at least one control member. In one example, the control member may have at least one input unit which may be installed in the second part and arranged to monitor at least one of the contact with a hand of the user and a duration of the contact, to form operative coupling with the stimulator unit, to operate between at least three (or two) states in response to such at least one of the contact and its duration, and to actuate the stimulator unit for effecting a first and a second of the movements in each of the states depending upon such at least one of the contact and duration. In another example, the control member may have at least one sensor unit which may be incorporated in the first part and arranged to sense at least one of the contact with the first part and the pelvic structure of the user and its duration, to form operative coupling with the stimulator unit, to operate between at least three (or two)

states in response to such at least one of the contact and its duration, and to actuate the stimulator unit for effecting a first and a second of the movements in each of the states depending upon such at least one of the contact and duration.

In another exemplary embodiment of this aspect of the invention, a system may include at least one body member of the first type, at least one actuator member of the third type, as well as at least one control member. In one example, the control member may have at least one input unit which may be incorporated into the second part and arranged to sense at least one of the contact with a hand of the user and a direction of the contact, to form operative coupling with the stimulator unit, to operate between at least three (or two) states in response to such at least one of the contact and direction thereof, and to actuate the stimulator unit for effecting a first and a second of the movements in each of the states depending upon such at least one of the contact and direction. In another example, the control member may include at least one sensor unit which may be incorporated into the first part and arranged to monitor at least one of the contact with the first part and the pelvic structure of the user and its direction, to form operative coupling with the stimulator unit, to operate between at least three (or two) states in response to such at least one of the contact and direction, and then to actuate the stimulator unit for effecting a first and a second of the movements in each of the states depending on such at least one of the contact and direction.

In another aspect of the present invention, another pelvic relaxing system may be arranged to provide tactile stimuli to at least one portion of the standard pelvic structure based upon at least one dynamic pattern of at least one of contact between an user and at least a part of such a system and force applied to the part by the user.

In one exemplary embodiment of this aspect of the invention, a system may include at least one body member of the third type, at least one actuator member, and at least one control member. The actuator member may include at least one stimulator unit which may be arranged to effect at least one of multiple movements of the body member for providing each of such stimuli to the pelvic structure by each of the movements. The control member may have at least one input unit which may be arranged to monitor the dynamic pattern of such at least one of the contact and the force thereof, to operatively couple with the stimulator unit, and then to effect at least one of such movements only while sensing presence of such a contact and/or force thereof.

In another exemplary embodiment of this aspect of the invention, a system may include at least one body member of the third type, at least one actuator member, and at least one control member. The actuator member may include at least one stimulator unit which may be arranged to effect at least one of multiple movements of the body member as a default movement and to effect at least another of the movements for providing each of such stimuli to the pelvic structure by each of the movements. The control member may include at least one input unit which may be arranged to monitor the dynamic pattern of such at least one of the contact and force thereof, to operatively couple with the stimulator unit, and to effect at least one of the movements which may be superposed on the default movement only while sensing presence of such at least one of the contact and force thereof.

Embodiments of the above four aspects of the present invention may also include one or more of the following features.

First of all, the above standard and auxiliary features apply to various systems, their members, and their units of the foregoing two aspects of this invention. The dynamic pattern may be temporal pattern which may include one or multiple movements of a preset part or different parts of the body member which may be arranged in a preset sequence or a sequence which may be at least partially determined by the user input. The dynamic pattern may be spatial pattern which may include one or multiple movements of a preset part or different parts of the body member which may move a preset portion or different portions of the pelvic structure. The input unit (or switch) and/or sensor unit may also be arranged to monitor a frequency of the force, its direction, its acceleration (or temporal rate of change), its displacement (or its integral over to time) caused thereby, and a compound value obtained through a mathematical manipulation of at least one of such amplitude, frequency, direction, duration, acceleration, and displacement, and then to control the stimulator unit based thereupon. The input unit (or switch) and/or sensor unit may be arranged to monitor a frequency of the contact, its direction, its acceleration (or temporal rate of change), its displacement (or integral over time) caused thereby, and a compound value obtained by a mathematical manipulation of at least one of the amplitude, frequency, direction, duration, acceleration, and displacement, and to control the stimulator unit based thereupon.

In another aspect of the present invention, another pelvic relaxing system may be arranged to provide tactile stimuli to at least one portion of the standard pelvic structure according to force applied to at least a part of the system by an user.

In one exemplary embodiment of this aspect of the invention, a system may include at least one body member of the first type, at least one actuator member of the fourth type, as well as at least one control member. In one example, the control member may include at least one input unit which may be incorporated into the second part and arranged to receive the force applied thereto by a hand of the user while monitoring at least one dynamic pattern of the force, to change its electric resistance as a response to the dynamic pattern, and to actuate the stimulator unit for effecting the movement with at least one dynamic feature which may change based on the dynamic pattern of the force. In another example, the control member may include at least one sensor unit which may be incorporated into the first part and arranged to receive such force applied thereto through the pelvic structure of the user while monitoring at least one dynamic pattern of the force, to vary its electric resistance in response to the dynamic pattern, and to actuate the stimulator unit for effecting the movement with at least one dynamic feature which may vary based on the dynamic pattern of the force.

In another exemplary embodiment of this aspect of the invention, a system may include at least one body member of the first type, at least one actuator member of the fourth type, as well as at least one control member. In one example, the control member may have at least one input unit which may be placed in the second part and arranged to receive the force applied thereto by a hand of the user while sensing its amplitude, to change its electric resistance in response to the amplitude, and then to actuate the stimulator unit for effecting such movement with at least one dynamic feature which may vary based on the amplitude. In another example, the control member may include at least one sensor unit which may be included into the first part and arranged to receive the force applied thereto through the pelvic structure of the user while sensing its amplitude, to vary its electric resistance in response to the amplitude, and then to actuate the stimulator unit for effecting such movement with at least one dynamic feature which is arranged to vary based on the amplitude.

In another exemplary embodiment of this aspect of the invention, a system may include at least one body member of the first type, at least one actuator member of the fourth type, as well as at least one control member. In one example, the control member may have at least one input unit which may be placed in the second part and arranged to receive the force applied thereto by a hand of the user while monitoring its direction, to change a spatial distribution of its electric resistance in response to the direction, and to actuate the stimulator unit for effecting such movement in another direction which is arranged to be at least partially determined by the direction. In another example, the control member may include at least one input unit which may be included in the second part and arranged to receive the force applied thereto by a hand of the user while monitoring its direction, to issue different signals as a response to the direction, and to actuate the stimulator unit for effecting the movement in another direction which may be at least partially determined by the direction. In another example, the control member may have at least one sensor unit which may be incorporated into the first part and arranged to receive the force applied thereto through the pelvic structure of the user while sensing its direction, to change a spatial distribution of its electric resistance in response to the direction of the force, and to actuate the stimulator unit for effecting such movement in another direction which may be at least partially determined by the direction. In another example, the control member may include at least one sensor unit which may be included into the first part and arranged to receive the force applied thereto through the pelvic structure of such an user while sensing a direction of the force, to issue different signals in response to the direction, and to actuate the stimulator unit for effecting the movement along another direction which may be at least partially determined by the direction of the force.

Embodiments of this aspect of the invention may include one or more of the following features.

First of all, the above standard and auxiliary features apply to various systems, their members, and their units of the above two aspects of this invention. The actuator member may be arranged to change at least one configuration of the first part of the body member, while the control member may actuate the actuator member in order to change such a configuration in response to the force. Such feature may include at least one of an amplitude (or displacement) of the movement, its rotation speed, direction, its duration, its frequency, its acceleration (or a temporal rate of change), and a compound value obtained through a mathematical manipulation of at least one of the amplitude, speed, frequency, direction, duration, and acceleration. The input unit and/or sensor unit may be made of and/or include a conductive foam, a variable resistance article, and the like.

In another aspect of the present invention, another pelvic relaxing system may be arranged to be waterproof while providing tactile stimulus to at least a portion of the standard pelvic structure.

In one exemplary embodiment of this aspect of the invention, a system may include at least one body member of the first type, at least one actuator member, at least one control member, and at least one case. The actuator member may be arranged to effect at least one movement of the first part for providing the stimulus to the portion through such movement. The control member may be arranged to control a dynamic pattern of the movement based upon the user input. The case may be arranged to enclose therein all of the body, actuator, and control members and to be waterproof and, accordingly, that the system may be arranged to be waterproof as well.

In another exemplary embodiment of this aspect of the present invention, a system may also have at least one body member, at least one actuator member, at least one control member, at least one power member, and at least one case. The body member may be arranged to contact the portion of the pelvic structure when engaged therewith, and the actuator member may be arranged to effect at least one movement of the body member for providing the stimulus to the portion by the movement. The control member may be arranged to control a dynamic pattern of the movement based on the user input, while the power member may be arranged to supply electric energy to the actuator and control members and to be rechargeable by electromagnetic induction. The case may be arranged to enclose therein all of the body, actuator, and control members and to be waterproof such that the system may be arranged to be waterproof as well and that the power member may be capable of being recharged while maintaining the system to be waterproof.

Embodiments of this aspect of the invention may include one or more of the following features.

First of all, the above standard and auxiliary features apply to various systems, their members, and their units of the above two aspects of this invention. The case may be provided as a separate article and disposed over all of the members. The case may define a waterproof exterior. An entire part of the case may be waterproof. At least a part of the body member may extend and form at least a part of the case.

In another aspect of the present invention, another pelvic relaxing system may be arranged to provide tactile stimuli to at least one portion of the standard pelvic structure in response to a contact between at least a part of the system and an user.

In one exemplary embodiment of this aspect of the invention, a system may include at least one body member of the first type, at least one actuator member of the first type, and at least one control member. In one example, the control member may have at least one input unit which may be arranged to be incorporated into the second part, to monitor the contact with a hand of the user, and to actuate the stimulator unit for effecting such movement only during a period in which the input unit may sense the contact. In another example, the control member may include at least one sensor unit which may be arranged to be incorporated into the first part, to monitor the contact with the portion of the pelvic structure, and to actuate the stimulator unit for effecting the movement only during a period in which the sensor unit senses the contact.

In another exemplary embodiment of this aspect of the invention, a system may include at least one body member with the first type, at least one actuator member, and at least one control member. The actuator member may be arranged to effect multiple movements of the first part for providing the stimuli onto different portions of such a structure through the movement. In one example, the control member may include multiple input units which may be arranged to be incorporated in the second part, to monitor the contact with a hand of the user, and then to actuate the stimulator unit for effecting the movement only during a period in which at least one of the input units senses the contact. In another example, the control member may have multiple sensor units which may be arranged to be installed in the first part, to monitor the contact with the portion of the structure, and to actuate the stimulator unit for effecting the movement only during a period in which at least one of the sensor units senses the contact.

Embodiments of this aspect of the invention may include one or more of the following features.

First of all, the above standard and auxiliary features apply to various systems, their members, and their units of the above two aspects of this invention. The control member may change dynamic feature of such movement in response to at least one of a duration of such contact, its frequency, its direction, its sequence, as well as dynamic pattern of force accompanying the contact. The control member may also actuate the actuator member and effect a default movement during another period in which at least one of the input and/or sensor units may not sense the contact.

Multiple input units (or sensor units) may be disposed side by side and may also be arranged at least substantially parallel, perpendicular or at a preset angle with respect to a longitudinal axis of the body member. Multiple input units (or sensor units) may extend along same, at least substantially identical lengths or different lengths. At least one of the input units (or sensor units) may also define a shape and/or a size different from those of the rest thereof.

In another aspect of the present invention, a method may be provided to supply tactile stimuli effected by at least one part of a body member of a pelvic relaxing system to at least a portion of the standard pelvic structure in response to an user input applied thereto.

In one exemplary embodiment of this aspect of the invention, a method may have the steps of: operatively coupling at least two stimulator units with different parts of the body member; controlling the stimulator units by an user input which is supplied thereto through a single input unit; manipulating the stimulator units one at a time (or simultaneously), thereby effecting different movements of such parts and generating different stimuli one at a time (or simultaneously); engaging the pelvic structure with the body member, thereby contacting different portions one at a time (or simultaneously) by the parts; and supplying different user inputs to the stimulator units through the input unit, thus providing different stimuli to the portions by the parts one at a time (or simultaneously).

In another exemplary embodiment of the aspect of the invention, a method may have the steps of: operatively coupling at least two stimulator units to different parts of the body member; controlling the stimulator units by an user input which is supplied thereto through a single input unit; manipulating the stimulator units one at a time (or simultaneously), thus effecting different movements of the parts and generating different stimuli one at a time (or simultaneously); engaging the structure with the body member, thus contacting the portion by the parts one at a time; and supplying different user inputs to the stimulator units through the input unit, thereby providing different stimuli to the portion by the parts one at a time.

In another exemplary embodiment of the aspect of the invention, a method may have the steps of: operatively coupling at least two stimulator units with the part of the body member; controlling the stimulator units by an user input supplied thereto through a single input unit; manipulating the stimulator units one at a time, thereby effecting different movements of the part and generating different stimuli one at a time; engaging the structure with the body member, thereby contacting different portions by the part one at a time; and supplying different user inputs to the stimulator units through the input unit, thereby providing different stimuli to the portions by the part one at a time.

In another exemplary embodiment of the aspect of the invention, a method may have the steps of: operatively coupling at least two stimulator units with the part of the body member; controlling the stimulator units by an user input supplied thereto through a single input unit; manipulating the stimulator units one at a time, thereby effecting different movements of the part and generating different stimuli one at a time; engaging such a structure with the body member, thereby contacting the portion by the part; and supplying different user inputs to the stimulator units through the input unit, thereby providing different stimuli to the portion by the part one at a time.

In another exemplary embodiment of the aspect of the invention, a method may have the steps of: operatively coupling a single stimulator unit with different parts of the body member; controlling the stimulator unit by an user input supplied thereto through a single input unit; manipulating the stimulator unit, thereby effecting different movements of the different parts and generating different stimuli one at a time (or simultaneously); engaging the pelvic structure with the body member, thereby contacting different portions by the parts one at a time (or simultaneously); and supplying different user inputs to the stimulator units through the input unit, thereby providing different stimuli to the portions by the parts one at a time (or simultaneously).

In another exemplary embodiment of the aspect of the invention, a method may have the steps of: operatively coupling a single stimulator unit with different parts of the body member; controlling the stimulator unit by an user input supplied thereto through a single input unit; manipulating the stimulator unit, thereby effecting different movements of the different parts and generating different stimuli one at a time (or simultaneously); engaging the pelvic structure with the body member, thereby contacting such a portion by the different parts one at a time; and supplying different user inputs to the stimulator units through the input unit, thereby providing different stimuli to the portion by the parts one at a time.

In another exemplary embodiment of such an aspect of the invention, a method may include the steps of: operatively coupling a single stimulator unit with the part of the body member; controlling the stimulator units by an user input supplied thereto through a single input unit; manipulating the stimulator unit, thereby effecting different movements of the part as well as generating different stimuli one at a time; engaging the pelvic structure with the body member, thereby contacting different portions by the part one at a time; and supplying different user inputs to the stimulator unit through the input unit, thus providing different stimuli to the different portions by the part one at a time.

In another exemplary embodiment of such an aspect of the invention, a method may include the steps of: operatively coupling a single stimulator unit with the part of the body member; controlling the stimulator unit by an user input supplied thereto through a single input unit; manipulating the stimulator unit, thereby effecting different movements of the part as well as generating different stimuli one at a time; engaging such a structure with the body member, thereby contacting the portion by the part; and supplying different user inputs to the stimulator units through the input unit, thereby providing different stimuli to the portion by the part one at a time.

In another exemplary embodiment of such an aspect of the invention, a method may include the steps of: engaging different portions of the pelvic structure with different parts of the body member; actuating at least two stimulator units one at a time (or simultaneously); effecting different movements of such parts through the stimulator units; operatively coupling the stimulator units with a single input unit; controlling the stimulator units by supplying different user inputs to the single input unit; and then transmitting the movements of the parts to the portions one at a time (or simultaneously).

In another exemplary embodiment of the aspect of the invention, a method may have the steps of: engaging different portions of the pelvic structure with the part of the body member; actuating at least two stimulator units one at a time (or simultaneously); effecting different movements of the part by the stimulator units one at a time; operatively coupling such stimulator units with a single input unit; controlling the stimulator units by supplying different user inputs through the single input unit; and then transmitting the movements of the part to the portion one at a time (or simultaneously).

In another exemplary embodiment of such an aspect of the invention, a method may include the steps of: providing at least two stimulator units for generating different stimuli; engaging the structure with different parts of the body member; contacting different portions of the structure with such parts by controlling the body member with the stimulator units one at a time (or simultaneously); operatively coupling the stimulator units with a single input unit; supplying different user inputs to the single input unit; and manipulating the stimulator units to provide different stimuli to the structure one at a time (or simultaneously) through the contacting.

In another exemplary embodiment of such an aspect of the invention, a method may include the steps of: providing at least two stimulator units for generating different stimuli; engaging the structure with the part of the body member; contacting different portions of the pelvic structure with the part by controlling the body member with the stimulator units one at a time; operatively coupling the stimulator units with a single input unit; supplying different user inputs to the single input unit; and manipulating the stimulator units for providing different stimuli to the structure one at a time through the contacting.

In another exemplary embodiment of the aspect of the invention, a method may have the steps of: operatively coupling at least two stimulator units to different parts of the body member; controlling the stimulator units by an user input which is supplied thereto through a single input unit; manipulating the stimulator units one at a time (or simultaneously), thereby effecting movement of the parts and also generating the stimuli one at a time (or simultaneously); engaging the structure with the body member, thereby contacting different portions by such parts one at a time (or simultaneously); and supplying different user inputs to the stimulator units through the input unit, thereby providing different stimuli to the portions by the parts one at a time (or simultaneously).

In another exemplary embodiment of the aspect of the invention, a method may have the steps of: operatively coupling at least two stimulator units to different parts of the body member; controlling the stimulator units by an user input which is supplied thereto through a single input unit; manipulating the stimulator units one at a time (or simultaneously), thereby effecting movement of such parts and generating the stimuli one at a time (or simultaneously); engaging the structure with the body member, thereby contacting the portion by the parts one at a time (or simultaneously); and supplying different user inputs to the stimulator units through the input unit, thus providing different stimuli to the portion by the parts one at a time (or simultaneously).

In another exemplary embodiment of the aspect of the invention, a method may have the steps of: operatively coupling at least two stimulator units with a single part of the body member; controlling the stimulator units by an user input which is supplied thereto through a single input unit; manipulating the stimulator units one at a time (or simultaneously), thereby effecting movement of the part and also generating the stimuli one at a time; engaging the structure with the body member, thereby contacting different portions by the part one at a time; and supplying different user inputs to the stimulator units through the input unit, thereby providing different stimuli to the portions by the part one at a time.

In another exemplary embodiment of the aspect of the invention, a method may have the steps of: operatively coupling a single stimulator unit with different parts of the body member; controlling the stimulator unit by an user input supplied thereto through a single input unit; manipulating the stimulator unit, thus effecting movement of the parts and generating the stimuli one at a time (or simultaneously); engaging the pelvic structure with the body member, thereby contacting different portions by the parts one at a time (or simultaneously); and supplying different user inputs to the stimulator unit through the input unit, thus providing different stimuli to the portions by the parts one at a time (or simultaneously).

In another exemplary embodiment of the aspect of the invention, a method may have the steps of: operatively coupling a single stimulator unit with different parts of the body member; controlling the stimulator unit by an user input supplied thereto through a single input unit; manipulating the stimulator unit, thus effecting movement of the parts and generating the stimuli one at a time (or simultaneously); engaging the pelvic structure with the body member, thereby contacting the portion by the parts one at a time (or simultaneously); and supplying different user inputs to the stimulator unit through the input unit, thereby providing different stimuli to the portion by the parts one at a time (or simultaneously).

In another exemplary embodiment of the aspect of the invention, a method may have the steps of: operatively coupling a single stimulator unit with a single part of the body member; controlling the stimulator unit by an user input supplied thereto through a single input unit; manipulating the stimulator unit, thus effecting movement of the part and generating the stimuli one at a time (or simultaneously); engaging the pelvic structure with the body member, thereby contacting different portions by the part one at a time (or simultaneously); and supplying different user inputs to the stimulator unit through the input unit, thus providing different stimuli to the portions by the part one at a time (or simultaneously).

In another aspect of the present invention, a method may be provided to supply stimuli effected by at least one part of a body member of a pelvic relaxing system to at least a portion of the standard pelvic structure in response to an user input applied thereto.

In one exemplary embodiment of this aspect of the invention, a method may include the steps of: operatively coupling different stimulator units with such a part of the body member; controlling the stimulator units by an user input supplied thereto through a single input unit; manipulating the stimulator units, thereby effecting different movements of the part as well as generating different stimuli one at a time; engaging the pelvic structure with the body member, thereby contacting the portion by the part; and supplying different user inputs to the stimulator units through such an input unit, thereby providing different stimuli to the portion by the part one at a time without moving the body member manually. In a related example, the engaging and supplying may be replaced by the steps of: engaging the structure with the body member, thereby contacting different portions by the part; and supplying different user inputs to the stimulator units through the input unit, thereby providing different stimuli to the portions by the part one at a time (or simultaneously) without having to move the body member manually.

In another exemplary embodiment of such an aspect of the invention, a method may include the steps of: providing power to a single stimulator unit through different driver units; operatively coupling the stimulator unit to the part of the body member; controlling the driver units by an user input supplied thereto through a single input unit; manipulating the stimulator unit with the driver units, thus effecting different movements of the part and generating different stimuli one at a time; engaging the structure with the body member, thereby contacting the portion by the part; and supplying different user inputs to the driver units through the input unit, thereby actuating the stimulator unit with different driver units and providing different stimuli to the portion by the part one at a time without manually moving the body member. In a related example, the above engaging and supplying may be replaced by the steps of: engaging the pelvic structure with the body member, thereby contacting different portions by the part; and supplying different user inputs to the driver units through the input unit, thereby actuating such a stimulator unit with different driver units and providing different stimuli to the different portions by the part one at a time (or simultaneously) without manually moving the body member.

In another exemplary embodiment of such an aspect of the invention, a method may include the steps of: providing power to a single stimulator unit by a single driver unit through each of different transmission lines; operatively coupling the stimulator unit with the part of the body member; controlling the transmission units by an user input supplied thereto through a single input unit; manipulating such a stimulator unit with the driver unit through the transmission units, thus effecting different movements of the part and generating different stimuli one at a time; engaging the pelvic structure with the body member, thereby contacting the portion by the part; and supplying different user inputs to one of the driver and transmission units through the input unit, thus actuating the stimulator unit through different transmission units and providing different stimuli to the portion by the part one at a time without having to manually move the body member. In a related example, the above engaging and supplying may be replaced by the steps of: engaging the structure with the body member, thereby contacting different portions by the part; and supplying different user inputs to one of such driver and transmission units through the input unit, thereby actuating the stimulator unit through different transmission units and providing different stimuli to the portions by the part one at a time (or simultaneously) without having to manually move the body member.

In another aspect of the present invention, a method may be provided to supply tactile stimuli effected by different parts of a body member of a pelvic relaxing system to at least a portion of the pelvic structure as a response to an user input applied thereto.

In one exemplary embodiment of this aspect of the invention, a method may have the steps of: operatively coupling different stimulator units with such different parts of the body member; controlling the stimulator units by an user input which is supplied thereto through a single input unit; manipulating the stimulator units, thereby effecting different movements of the parts as well as generating different stimuli one at a time (or simultaneously); engaging the pelvic structure with the body member, thereby contacting the portion by the parts one at a time (or simultaneously); and then supplying different user inputs to the stimulator units through the input unit, thereby providing different stimuli to the portion by the parts one at a time (or simultaneously) without having to move the body member manually.

In another exemplary embodiment of such an aspect of the invention, a method may include the steps of: providing power to a single stimulator unit through different driver units; operatively coupling the stimulator unit with the different parts of the body member; controlling the driver units by an user input supplied thereto through a single input unit; manipulating the stimulator unit with the driver units, thereby effecting different movements of such parts and generating different stimuli one at a time (or simultaneously); engaging the pelvic structure with the body member, thereby contacting the portion by the parts one at a time (or simultaneously); and supplying different user inputs to the driver units through the input unit, thus actuating the stimulator unit with different driver units and also providing different stimuli to such a portion through the parts one at a time without manually having to move the body member.

In another exemplary embodiment of such an aspect of the invention, a method may include the steps of: providing power to a single stimulator unit from a single driver unit by different transmission lines; operatively coupling the stimulator unit with the different parts of the body member; controlling the transmission units by an user input supplied thereto through a single input unit; manipulating the stimulator unit with the driver unit through the transmission units, thus effecting different movements of the parts and generating different stimuli one at a time; engaging the pelvic structure with the body member, thereby contacting the portion by the part; and supplying different user inputs to one of the driver and transmission units through the input unit, thereby actuating the stimulator unit by different transmission units and providing different stimuli to the portion by the part one at a time without moving the body member manually.

In another aspect of the present invention, a method may be provided to supply tactile stimuli by at least one part of a body member of a pelvic relaxing system to at least a portion of the standard pelvic structure in response to an user input applied thereto.

In one exemplary embodiment of this aspect of the invention, a method may include the steps of: operatively coupling at least one stimulator unit with the part of the body member; controlling the stimulator unit by an user input defining preset dynamic pattern supplied thereto through a single input unit; manipulating the stimulator unit, thereby effecting different movements of the part and generating different stimuli in response to the dynamic pattern of the user input; contacting the portion by the part; and supplying different user inputs to the stimulator unit through the input unit, thus changing dynamic feature of the movement and providing different stimuli to the portion based on the dynamic pattern.

In another exemplary embodiment of such an aspect of the invention, a method may include the steps of: operatively coupling at least one stimulator unit with the part of the body member; controlling the stimulator unit with an amplitude, a direction, and/or a duration of force supplied thereto by an user through a single input unit; manipulating the stimulator unit, thus effecting different movements of such a part and generating different stimuli in response to such at least one of the amplitude, direction, and duration of the force; contacting the portion by the part; and then supplying different user inputs to the stimulator unit through the input unit, thereby changing dynamic feature of the movement and thereby providing different stimuli to the portion depending on such an amplitude, direction, and duration of the force.

In another exemplary embodiment of such an aspect of the invention, a method may include the steps of: operatively coupling at least one stimulator unit with the part of the body member; controlling the stimulator unit through an amplitude and/or a duration of a contact between an user and a single input unit; manipulating such a stimulator unit, thereby effecting different movements of the part and generating different stimuli in response to the amplitude and/or duration of the contact; contacting the portion by the part; and then supplying different user inputs to the stimulator unit through the input unit, thereby changing dynamic feature of the movement and providing different stimuli to the portion based on such an amplitude and duration of the force.

In another exemplary embodiment of such an aspect of the invention, a method may include the steps of: operatively coupling at least one stimulator unit with the part of the body member; controlling the stimulator unit through a depth and/or a duration of insertion of the part inside the cavity through a single sensor unit; manipulating the stimulator unit, thereby effecting different movements of the part and generating different stimuli in response to such a depth and duration of the insertion; contacting the portion by the part; and supplying different user inputs to the stimulator unit through the input unit, thereby changing dynamic feature of the movement and providing different stimuli to the portion based on such a depth and/or duration of the insertion.

In another aspect of the present invention, a method may be provided to supply tactile stimuli by at least one part of a body member of a pelvic relaxing system to at least a portion of the standard pelvic structure through a variable resistance input unit.

In one exemplary embodiment of this aspect of the invention, a method may include the steps of: operatively coupling different stimulator units with different parts of the body member; controlling the stimulator units by an user input through a single input unit; changing electric resistance of such an input unit in response to the user input; manipulating the stimulator units, thereby effecting different movements of the different parts and generating different stimuli in response to change in the electric resistance of the user input; contacting the portion by the parts one at a time; and supplying different user inputs to the stimulator unit through the input unit, thus varying dynamic feature of the movement and providing different stimuli to the portion one at a time depending on the electric resistance of the input unit which may in turn be determined by the user input. In a related example, such contacting and supplying may be replaced by the steps of: contacting the portions by the parts one at a time (or simultaneously); and supplying different user inputs to the stimulator unit through the input unit, thus changing dynamic feature of the movement and providing different stimuli to the portions one at a time (or simultaneously) depending on the electric resistance of the input unit which is in turn determined by the user input.

In another exemplary embodiment of such an aspect of the invention, a method may include the steps of: operatively coupling at least one stimulator unit with the part of the body member; controlling the stimulator unit by an user input through a single input unit; changing electric resistance of the input unit in response to the user input; manipulating the stimulator unit, thus effecting different movements of the part and generating different stimuli in response to change in the electric resistance of the user input; contacting the portion by the part; and then supplying different user inputs to the stimulator unit through the input unit, thereby changing dynamic feature of the movement and also providing different stimuli to the portion depending on the electric resistance of the input unit which is in turn determined by the user input. In a related example, such contacting and supplying may be replaced by the steps of: contacting different portions by the part one at a time; and supplying different user inputs to the stimulator unit through the input unit, thereby changing dynamic feature of the movement and providing different stimuli to such portions one at a time depending upon the electric resistance of the input unit which is in turn determined by the user input.

In another exemplary embodiment of such an aspect of the invention, a method may include the steps of: operatively coupling at least one stimulator unit with the part of the body member; controlling the stimulator unit by an user input through a single input unit; disposing the input unit around a handle of the body member; receiving the user input from an user while holding the system by such a handle; changing electric resistance of the input unit in response to the user input; manipulating the stimulator units, thereby effecting different movements of such different parts and generating different stimuli in response to change in the electric resistance of the user input; contacting the portion by the parts one at a time; and then supplying different user inputs to the stimulator unit through the input unit, thereby changing dynamic feature of the movement and providing different stimuli to the portion one at a time depending on the electric resistance of the input unit which is in turn determined by the user input. In a related example, such disposing and receiving may be replaced by the steps of: disposing the input unit on a top of a handle of such a body member; and receiving the user input from a thumb of an user while holding the system by the handle. In another related example, such disposing and receiving may be replaced by the steps of: forming the input unit as a top of a handle of the body member; and then receiving the user input from a thumb of an user while swiveling the system by the handle. In another related example, such disposing and receiving may be replaced by the steps of: disposing the input unit under a handle of the body member; and receiving the user input from an user while holding the system by the handle and pressing the system.

Embodiments of the above method aspects of the present invention may include one or more of the following features.

Such coupling may include the step of: mechanically, electrically, and/or magnetically coupling the part with the stimulator unit (or actuator member) such coupling may also include at least one of the steps of: directly coupling such a stimulator unit (or actuator member) with the part; interposing an electric and/or viscous element between the part and stimulator unit (or actuator member); disposing at least one gear unit so as to change a rotational speed of the stimulator unit (or actuator member); and disposing at least one transmission unit so as to change a direction of power from the part to the stimulator unit (or actuator member).

Such controlling may include the steps of: receiving the user input with at least a substantially identical part of the input unit; receiving the user input with a periphery of the input unit; receiving the user input by horizontally, vertically or transversely depressing the input unit; and receiving the user input through a contact between the input unit and user, and the like. Such controlling may include at least one of the steps of: actuating the stimulator unit (or actuator member) based on temporal pattern and/or dynamic pattern of the user input; and actuating the stimulator unit (or actuator member) based on default dynamic pattern. The controlling may include the steps of: incorporating multiple input units side by side in a direction perpendicular to a longitudinal axis of the body member; and receiving the user input with one or multiple input units. The controlling may not include at least one of the steps of: turning on and off the stimulator unit (or actuator member); turning off and on such a stimulator unit (or actuator member); and changing a speed of the movement between at least two substantially identical portions of the pelvic structure. The controlling may neither include one of the steps of: moving such a stimulator unit (or actuator member) between the states; and turning off and on the stimulator unit (or actuator member) between the states. The controlling may neither include the step of: changing a length of the body member inserted in the cavity of the pelvic structure.

Such manipulating may include at least one of the steps of: effecting different movements with different dynamic features; and changing at least one configuration of the body member which may be a length of the body member, its diameter, its curvature, and/or surface texture. The manipulating may include at least one of the steps of: controlling a single stimulator unit (or actuator member) by the different user inputs supplied to the single input unit; and then controlling multiple stimulator units (or actuator member) by the different user inputs supplied to the single input unit.

Such effecting may include at least one of the steps of: controlling a temporal feature and/or a spatial feature of the movement; controlling a duration of the movement, its frequency, and/or temporal sequence thereof; controlling an amplitude of the movement (or displacement), its direction, and/or its type; and selecting the movement from horizontal, vertical or transverse translation, vibration, angular rotation, rotation about a center of rotation or axis of rotation defined in the body member, swiveling, tapping, deformation, and so on. The effecting may also include the step of: effecting one or multiple movements of a preset part (or different parts) of the body member which may be arranged in such a sequence which may be a preset sequence or a sequence which may be at least partially determined by the user input. The effecting may also include the step of: effecting one or multiple movements of a preset part and/or different parts of the body member while contacting a preset portion or different portions of the pelvic structure.

The contacting may include the step of: engaging the part with one of a clitoris of the entry, a G spot on the wall, other portions of the wall, and the like.

Such supplying may also include at least one of the steps of: supplying the user inputs without moving a hand of an user from the body member; supplying the user inputs without changing a grip of the body member; and supplying the user inputs by at least one finger of an user while holding a grip of the body member with the finger. The supplying may include at least one of the steps of: continuing the effecting only during a period of the supplying; and terminating the effecting in a preset period of terminating the supplying. The supplying may include one of the steps of: effecting only the movement intended by the user input; and superposing the movement intended by the user input onto a default movement. The supplying may be replaced by the step of: supplying different user inputs through the input unit, thereby changing a configuration of the body member without manually replacing the body member. Such supplying may include at least one of the steps of: controlling temporal and/or spatial pattern of such an user input; controlling a duration of the user input, its frequency, and/or its temporal sequence; controlling an amplitude of the user input (or displacement), its direction, and/or its type; and then selecting the user input from vibration, horizontal, vertical or transverse translation, angular rotation, rotation about a center and/or axis of rotation defined in or on the body member, swiveling, tapping, deformation, and the like. The supplying may also include the step of: contacting the portion with at least one sensor unit of the system while holding and manipulating the body member with a hand thereof during use of the system without having to move a finger thereof. Such supplying may also include the step of: controlling a frequency of such an user input, its temporal rate of change (or its acceleration), its displacement (or its integral over time) caused thereby, and/or a compound value obtained through at least one of mathematical manipulation of at least one thereof. The supplying may include the step of: initiating and then terminating contact between the user and input unit (or switch) regardless of the force which accompanies the contact. The changing may include one of the steps of: incorporating a conductive foam in the input unit; and including a variable resistance element in the input unit. In addition, the changing may not include the step of: moving the actuator member only in an opposite direction at the same speed and/or with the same type of movement.

The method may also include the steps of: incorporating at least one auxiliary input unit under, over, in or around the input unit; and receiving the user input not only through the input unit but also through such an auxiliary input unit. Such incorporating may also include at least one of the steps of: manipulating a single stimulator unit (or actuator member) by the input unit and auxiliary input unit for effecting different movements, moving different parts of the body member, and/or contacting different portions of such a structure; manipulating different stimulator units (or actuator member) for effecting different movements, moving different parts of the body member, and contacting different portions of the structure; and manipulating different driver units and/or transmission units for effecting different movements, moving different parts of the body member, and/or contacting different portions of such a structure. The method may include the steps of: incorporating multiple input units; and then operating at least two of the input units similar to the single input unit. The selecting may include at least one of the steps of: using a joystick as the input unit; using a touch pad as the input unit; and using a track ball as the input unit.

In another aspect of the present invention, a pelvic relaxing system may include at least one part of a body member for providing tactile stimuli to at least a portion of the standard pelvic structure.

In one exemplary embodiment of such an aspect of the invention, a system may be made by a process including the steps of: defining on such a body member different parts capable of contacting different portions of the pelvic structure when engaged therewith; disposing at least two stimulator units capable of effecting different movements of the parts; operatively coupling the stimulator units with a single input unit capable of receiving different user inputs through at least a substantially similar area thereof; and then operating the input unit between at least three (or two) states in response to the user inputs, thereby actuating the stimulator units in each of the states for generating each of the movements of the parts and for delivering the stimuli to each of the portions without manually moving the body member one at a time (or simultaneously).

In another exemplary embodiment of this aspect of the invention, a system may be made by a process including the steps of: defining on the body member different parts capable of contacting the portion of the pelvic structure when engaged therewith one at a time; disposing at least two stimulator units capable of effecting different movements of the parts; operatively coupling the stimulator units with a single input unit capable of receiving different user inputs through at least a substantially similar area thereof; and then operating the input unit between at least three (or two) states in response to the user inputs, thereby actuating the stimulator units in each of the states for generating each of the movements of the parts and for also delivering the stimuli to the portion one at a time without manually moving the body member.

In another exemplary embodiment of this aspect of the invention, a system may be made by a process including the steps of: defining on such a body member a single part capable of contacting different portions of the pelvic structure when engaged therewith one at a time; disposing at least two stimulator units which are capable of effecting different movements of the part; operatively coupling the stimulator units with a single input unit capable of receiving different user inputs through at least a substantially similar area thereof; and operating the input unit between at least three (or two) states in response to the user inputs, thereby actuating the stimulator units in each of the states for generating each of the movements of the part and for delivering the stimuli to the portions one at a time without manually moving the body member.

In another exemplary embodiment of this aspect of the invention, a system may be made by a process including the steps of: defining on the body member a single part capable of contacting such a portion of such a structure when engaged therewith one at a time; disposing at least two stimulator units capable of effecting different movements of the part; operatively coupling such stimulator units with a single input unit capable of receiving different user inputs through at least a substantially similar area thereof; and then operating the input unit between at least three (or two) states in response to the user inputs, thereby actuating the stimulator units in each of the states for generating each of the movements of the part and for also delivering the stimuli to the portion one at a time without manually moving the body member.

In another exemplary embodiment of this aspect of the invention, a system may be made by a process including the steps of: defining on such a body member different parts capable of contacting different portions of the pelvic structure when engaged therewith; disposing a single stimulator unit capable of effecting different movements of the parts; operatively coupling the stimulator unit with a single input unit capable of receiving different user inputs through at least a substantially similar area thereof; and operating the input unit between at least three (or two) states as a response to the user inputs, thus actuating the stimulator unit in each of the states for generating each of the movements of the parts and for delivering the stimuli to each of the portions one at a time (or simultaneously) without manually moving the body member.

In another exemplary embodiment of this aspect of the invention, a system may be made by a process including the steps of: defining on the body member different parts capable of contacting the portion of the pelvic structure when engaged therewith; disposing a single stimulator unit capable of effecting different movements of the parts; operatively coupling the stimulator unit with a single input unit capable of receiving different user inputs through at least a substantially similar area thereof; and operating the input unit between at least three (or two) states in response to the user inputs, thereby actuating the stimulator unit in each of the states for generating each of the movements of the parts and for delivering the stimuli to the portion one at a time without manually moving the body member.

In another exemplary embodiment of this aspect of the invention, a system may be made by a process including the steps of: defining on such a body member a single part capable of contacting different portions of the pelvic structure when engaged therewith; disposing a single stimulator unit capable of effecting different movements of the part; operatively coupling the stimulator unit with a single input unit capable of receiving different user inputs through at least a substantially similar area thereof; and operating the input unit between at least three (or two) states as a response to the user inputs, thus actuating the stimulator unit in each of the states for generating each of the movements of the part and for delivering the stimuli to each of the portions one at a time without manually moving the body member.

In another exemplary embodiment of this aspect of the invention, a system may be made by a process including the steps of: defining on the body member a single part capable of contacting the portion of the pelvic structure when engaged therewith; disposing a single stimulator unit capable of effecting different movements of the part; operatively coupling the stimulator unit with a single input unit capable of receiving different user inputs through at least a substantially similar area thereof; and operating the input unit between at least three (or two) states in response to the user inputs, thereby actuating the stimulator unit in each of the states for generating each of such movements of the part and for delivering the stimuli to the portion one at a time without manually moving the body member.

In another exemplary embodiment of this aspect of the invention, a system may be made by a process including the steps of: defining on such a body member different parts capable of contacting different portions of the pelvic structure when engaged therewith; disposing at least two stimulator units each capable of effecting movement of the parts; operatively coupling the stimulator units with a single input unit capable of receiving different user inputs through at least a substantially similar area thereof; and operating the input unit between at least three (or two) states in response to the user inputs, thereby actuating the stimulator units in each of the states for generating the movement of the parts and for delivering the stimuli to each of the portions one at a time (or simultaneously) without manually moving the body member.

In another exemplary embodiment of this aspect of the invention, a system may be made by a process including the steps of: defining on the body member different parts capable of contacting the portion of the pelvic structure when engaged therewith; disposing at least two stimulator units each capable of effecting movement of the parts; operatively coupling the stimulator units with a single input unit capable of receiving different user inputs through at least a substantially similar area thereof; and operating the input unit between at least three (or two) states in response to the user inputs, thereby actuating the stimulator units in each of the states for generating the movement of such parts and for delivering the stimuli to the portion one at a time (or simultaneously) without manually moving the body member.

In another exemplary embodiment of this aspect of the invention, a system may be made by a process including the steps of: defining on such a body member a single part capable of contacting different portions of the pelvic structure when engaged therewith; disposing at least two stimulator units each capable of effecting movement of the parts; operatively coupling the stimulator units with a single input unit capable of receiving different user inputs through at least a substantially similar area thereof; and operating the input unit between at least three (or two) states in response to the user inputs, thereby actuating the stimulator units in each of the states for generating the movement of the part and for delivering the stimuli to each of the portions one at a time without manually moving the body member.

In another exemplary embodiment of this aspect of the invention, a system may be made by a process including the steps of: defining on such a body member different parts capable of contacting different portions of the structure when engaged therewith; disposing a single stimulator unit capable of effecting movement of the parts; operatively coupling such a stimulator unit with a single input unit capable of receiving different user inputs through at least a substantially similar area thereof; and operating the input unit between at least three (or two) states in response to the user inputs, thereby actuating the stimulator unit in each of the states for generating the movement of the parts and for delivering the stimuli to each of the portions one at a time (or simultaneously) without moving the body member manually.

In another exemplary embodiment of this aspect of the invention, a system may be made by a process including the steps of: defining on the body member different parts capable of contacting the portion of the pelvic structure when engaged therewith; disposing a single stimulator unit capable of effecting movement of the parts; operatively coupling the stimulator unit to a single input unit capable of receiving different user inputs through at least a substantially similar area thereof; and operating the input unit between at least three (or two) states in response to the user inputs, thereby actuating the stimulator unit in each of the states for generating the movement of the parts and for delivering the stimuli to the portion one at a time (or simultaneously) without manually moving the body member.

In another exemplary embodiment of this aspect of the invention, a system may be made by a process including the steps of: defining on such a body member a single part capable of contacting different portions of the pelvic structure when engaged therewith; disposing a single stimulator unit capable of effecting movement of the parts; operatively coupling the stimulator unit with a single input unit capable of receiving different user inputs through at least a substantially similar area thereof; and operating the input unit between at least three (or two) states in response to the user inputs, thereby actuating the stimulator unit in each of the states for generating the movement of such a part and for delivering the stimuli to each of the portions one at a time without manually moving the body member.

In another aspect of the present invention, a pelvic relaxing system may include at least one input unit for receiving an user input and capable of providing tactile stimuli to at least a portion of the standard pelvic structure.

In one exemplary embodiment of such an aspect of the invention, a system may be made by a process including the steps of: defining on a body member at least two parts capable of contacting different portions of the pelvic structure when engaged therewith; arranging a first stimulator unit to effect a first movement of a first of the parts for providing one of the stimuli to one of the portions by the first movement; arranging a second stimulator unit to effect a second movement of a second of such parts for providing another of the stimuli to another of such portions by the second movement; operatively coupling the stimulator units to a single input unit capable of receiving different user input through at least a substantially similar area thereof; and operating the input unit between at least three (or two) states in response to the user inputs, thereby actuating at least one of the stimulator units in one of the states and at least another of the stimulator units in another of the states.

In another exemplary embodiment of this aspect of the invention, a system may be made by a process including the steps of: defining on such a body member a single part capable of contacting different portions of the pelvic structure one at a time when engaged therewith; arranging a single stimulator unit to effect different movements of such a part for providing the stimuli to such portions; operatively coupling the stimulator unit with a single input unit capable of receiving different user input through at least a substantially similar area thereof; and operating the input unit between at least three (or two) states in response to the user inputs, thereby actuating the stimulator unit for providing a first of the movements for providing one of the stimuli in one of the states and for also providing a second of such movements for providing another of the stimuli in another of the states one at a time without manually moving the body member.

In another exemplary embodiment of this aspect of the invention, a system may be made by a process including the steps of: defining on a body member at least two parts capable of contacting such a portion of the pelvic structure one at a time when engaged therewith; arranging at least one stimulator unit to effect different movements of the parts for providing the stimuli to such a portion; operatively coupling the stimulator unit with a single input unit capable of receiving different user input through at least a substantially similar area thereof; and operating the input unit between at least three (or two) states in response to the user inputs, thereby actuating the stimulator unit for providing a first of the movements for providing one of the stimuli in one of the states and for also providing a second of such movements for providing another of the stimuli in another of the states one at a time without manually moving the body member.

In another exemplary embodiment of this aspect of the invention, a system may be made by a process including the steps of: defining on such a body member a single part capable of contacting different portions of the pelvic structure one at a time when engaged therewith; arranging at least one stimulator unit capable of disposing such a part in either of the portions one at a time without manually moving the body member and effecting at least one movement of the part for providing such stimuli to the portion; operatively coupling the stimulator unit to a single input unit capable of receiving different user input through at least a substantially similar area thereof; and operating the input unit between at least three (or two) states in response to the user inputs, thereby actuating such a stimulator unit for providing a first of the movements for providing one of the stimuli to one of the portions in one of the states and for providing a second of the movements for providing another of the stimuli to another of the portions in another of the states one at a time without manually moving the body member.

More product-by-process claims may be constructed by modifying the foregoing preambles or their modifications of the above system and/or method claims and by appending thereto the foregoing bodies or their modifications of the above system and/or method claims. Such process claims may be arranged to include one or more of the aforementioned features of the above system and/or method claims of the present invention.

The pelvic relaxing systems of this invention offer various advantages over their conventional counterparts. Most importantly, such a system allows the user to control dynamic features of various movements of its actuator member (or stimulator unit) and/or a configuration of the body member as a response to dynamic patterns of such user inputs without requiring the user to change the grip and/or to move his or her hand.

Such a system also allows its user to contact a specific portion of the structure with different parts of the system, to contact different portions of the structure with the specific part of the system, to individually and/or simultaneously control contacts between different portions of the structure and different parts of the system, to supply different user inputs through at least a substantially identical area of its specific input unit. Thus, the user may control various dynamic features of movements of the system and/or a configuration of the system in response to various dynamic patterns of such user inputs without requiring the user to manually move or rotate the system and without having to change the grip or move his or her hand.

Various systems of the present invention may be utilized to enhance sexual functioning such as gratification or relief of the user. Such systems may also be used for sexual assist. In addition, the systems may be utilized to exercise vaginal muscles, to facilitate recovery of the pelvic structure after surgery or accident. Such systems may be used or slightly modified for anal anatomy and/or prostate anatomy.

As used herein, both of the terms "input unit" and "sensor unit" refer to those units of various pelvic relaxing systems capable of receiving user inputs and/or monitoring dynamic pattern thereof. However, the "input unit" and "sensor unit" are to be differentiated as follows within the scope of the present invention. First of all, the "input unit" is generally disposed in a part of a body member of such a system which is intended to not be inserted into a cavity of a pelvic structure, whereas the "sensor unit" is preferably disposed in such an insertable part of the body member. Therefore, the "input unit" mainly receives the user inputs through a hand or finger of an user, while the "sensor unit" generally receives the user inputs through various portions of the pelvic structure.

The terms "proximal" and "distal" will be used in a relative context. Throughout this invention, the term "proximal" is to be used to denote a direction toward a head of a body member of a system, while the term "distal" is to be used to denote an opposite direction toward an end of a handle of such a system. Accordingly, a "proximal" end and a "distal" end may be defined with respect to an entire pelvic relaxing system or with respect to a specific member or unit thereof.

The terms "input unit" and "sensor unit" generally refer to identical or similar articles capable of monitoring various dynamic patterns of various user inputs applied thereto. Throughout this invention, however, the "input units" represent such articles incorporated into a handle part (or a second unit) of a body member of a pelvic relaxing system, while the "sensor units" denote such articles incorporated into an insertable part (or a first unit) of such a body member. Accordingly, any articles which may be used as the "input unit" may also be used as the "sensor unit" unless otherwise specified. In addition, the "input unit" may also be disposed in the insertable part of the body member, while the "sensor unit" may also be disposed in the handle part thereof when desired.

As used herein, a "dynamic pattern" refers to a temporal pattern as well as a spatial pattern of an user input and/or of a sensing signal each of which is generated by an input unit and/or a sensor unit of a control member in response to the user input, while a "dynamic feature" refers to a temporal feature as well as a spatial feature of movement of a single part or multiple parts of a body member.

Unless otherwise defined in the following specification, all technical and scientific terms used herein have the same meaning as commonly understood by one of ordinary skill in the art to which the present invention belongs. Although the methods or materials equivalent or similar to those described herein can be used in the practice or in the testing of the present invention, the suitable methods and materials are described below. All publications, patent applications, patents, and/or other references mentioned herein (particularly those enumerated in the above Background section) are incorporated by reference in their entirety. In case of any conflict, the present specification, including definitions, will control. In addition, the materials, methods, and examples are illustrative only and not intended to be limiting.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
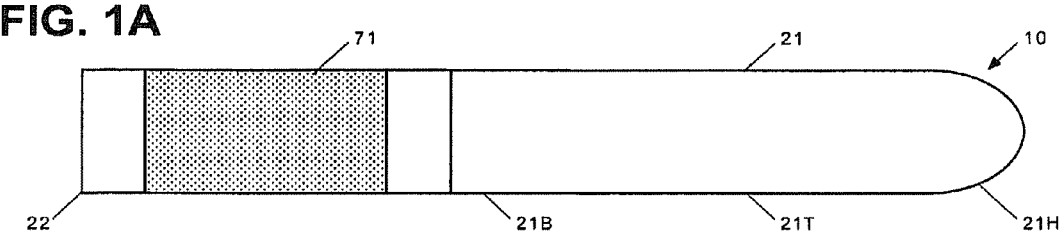
FIGS. 1A to 1D are schematic cross-sectional diagrams of exemplary pelvic relaxing systems with different body members and input units according to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention generally relates to pelvic relaxing systems for providing various stimuli to various portions of a pelvic structure such as, e.g., a clitoris, G spot, and various other intravaginal portions defined inside and/or around a vaginal cavity. More particularly, the present invention relates to a pelvic relaxing system which includes a body member including at least one part for engaging at least one portion of the pelvic structure, which includes at least one actuator member for effecting the same or different movements of the same or different parts of the body member, and which includes at least one input unit capable of receiving various user inputs and manipulating its actuator member in order to effect the same or different movements of the same or different parts, thereby providing the same or different stimuli to the same or different portions of the pelvic structure through such same or different parts, without mandating an user to manually move the body member during relaxing. Such a system is preferably designed to allow its user to manipulate the actuator member as well as to effect desirable movements of the same or different parts of the body member by supplying the user inputs to a specific input unit of the system during use while holding the system with his or her hand without having to change his or her grip or to move his or her hand with respect to the body member.

The present invention also relates to various methods of providing various stimuli to the above portions of the pelvic structure. More particularly, the present invention relates to various methods of providing the same or different stimuli to the same or different portions of the pelvic structure through the same or different parts of the body member without requiring the user to manually move the body member with respect to the structure. The present invention relates to various methods of receiving different user inputs by a specific input unit and manipulating a specific actuator member to effect the same or different movements of the same or different parts of the body member so as to provide the same or different stimuli to the same or different portions of the pelvic structure in response to such user inputs. The present invention further relates to various processes for providing such systems and various members and/or units thereof.

Various aspects and/or embodiments of various systems, methods, and/or processes of this invention will now be described more particularly with reference to the accompanying drawings and text, where such aspects and/or embodiments thereof only represent different forms. Such systems, methods, and/or processes of this invention, however, may also be embodied in many other different forms and, accordingly, should not be limited to such aspects and/or embodiments which are set forth herein. Rather, various exemplary aspects and/or embodiments described herein are provided so that this disclosure will be thorough and complete, and fully convey the scope of the present invention to one of ordinary skill in the relevant art.

Unless otherwise specified, it is to be understood that various members, units, elements, and parts of various systems of the present invention are not typically drawn to scales and/or proportions for ease of illustration. It is also to be understood that such members, units, elements, and/or parts of various systems of this invention designated by the same numerals may typically represent the same, similar, and/or functionally equivalent members, units, elements, and/or parts thereof, respectively.

In one aspect of the present invention, pelvic relaxing systems may be provided with various members and units for effecting various movements and providing various stimuli to a portion and/or multiple portions of the pelvic structure. FIGS. 1A through 1D are schematic cross-sectional views of exemplary pelvic relaxing systems including different body members and input units according to the present invention.

In one exemplary embodiment of this aspect of the invention and as described in FIG. 1A, an exemplary pelvic relaxing system 10 includes a body member 20 with a first unit 21 and a second unit 22, an actuator member incorporated inside the body member 20 (thus not shown in this figure), and a control member with an input unit 71 and other units incorporated inside the body member 20 (thus not shown in this figure). The first unit 21 is typically elongated and arranged to be inserted into the pelvic cavity during use, while the second unit 22 is distally coupled to the first unit 21 and arranged to form a grip for an user during use. The first unit 21 is generally divided into a head 21H, a trunk 21T, and a base 21B. The head 21H is formed in a proximal end of the body member 20 and rounded to facilitate insertion of the body member 20 into the pelvic cavity through the opening of the pelvic structure. The trunk 21T is connected distally to the head 21H and terminates in the base 21B which then couples to the second unit 22. In general, the head 21H, trunk 21T, and base 21B are fixedly or movably coupled to each other and form an unitary body member 20. In the alternatively, the head 21H, trunk 21T, and base 21B may form an unitary first unit 21. As far as the body member 20 may generate one or more desirable movements, detailed construction and/or coupling modes of such parts 21H, 21T, 21B may not be generally material to the scope of the present invention. The second unit 22 is also elongated and has a shape and/or size to form the grip for the user, whether the user grabs the second unit 22 with his or her thumb pointing proximally, distally, and/or laterally. The second unit 22 may be movably or fixedly coupled to each other and form an unitary body member 20. In the alternative, the first and second units 21, 22 may instead define an unitary body member 20. As long as the body member 20 may generate one or more desirable movements, detailed construction and/or coupling modes of such first and second units 21, 22 are generally not material to the scope of the present invention. As will be described below, the pelvic relaxing system 10 also includes various other members and units for normal operation. When such units 21, 22 may form cavities therein, such members and/or units may be incorporated into one or both of such units 21, 22. Alternatively, at least one of such members and units may be exposed through surfaces of such units 21, 22.

The input unit 71 is disposed around the second unit 22 and exposed to provide direct access to the user. The input unit 71 of this embodiment is arranged to receive an user input through at least a substantial area thereof. The input unit 71 is further disposed in a center part of the second unit 22, while defining vacant areas between itself 71 and a proximal end and a distal end of the second unit 22. Therefore, such an input unit 71 shares an area of the second unit 22 which is used to define the grip for the user. As will be explained in greater detail below, the input unit 71 is preferably arranged to monitor various dynamic patterns of mechanical or electrical contact between the user and/or force applied thereto by the user and to generate sensing signals based upon such dynamic patterns. More specifically, such an input unit 71 may generate the sensing signals of which amplitudes, durations or other temporal and/or spatial patterns may be determined by the contact and/or force for grabbing and holding the second unit 22. Thus, the user may control various features of pelvic relaxing operation while grabbing and holding the second unit 22 during use and without having to change the grip of the second unit 22, without having to move his or her hand in order to reach the input unit 71 while holding or grabbing the second unit 22, and the like. Further details of input units of such a type are provided in conjunction with FIGS. 3A to 3H.

In operation, the first and second units 21, 22 are fixedly or movably coupled to each other and form the body member 20. The system 10 is then connected to an electric power outlet with a power supply cable (not included in the figure) or provided with a battery disposed inside the first or second unit 21, 22. The user may then insert the head 21H of the first unit 21 of the body member 20 into the pelvic cavity through the pelvic opening. When the user contacts the input unit 71 and/or presses the input unit 71, the input unit 71 begins to generate the sensing signals based upon one or more dynamic patterns of the user input and delivers the sensing signals to the control member which manipulates a stimulator unit (not shown in the figure). Depending on dynamic characteristics thereof, the stimulator unit effects one or multiple movements of a single part or multiple parts of the body member 20 and/or one or multiple movements of at least a substantial part of the body member 20, thereby providing the same or different stimuli to one or more portions of the pelvic structure. In the embodiment of FIG. 1A, the stimulator unit is disposed inside the first unit 21 of the body member 20 and generates vibration of an entire part of the first unit 21.

Figure 1B:
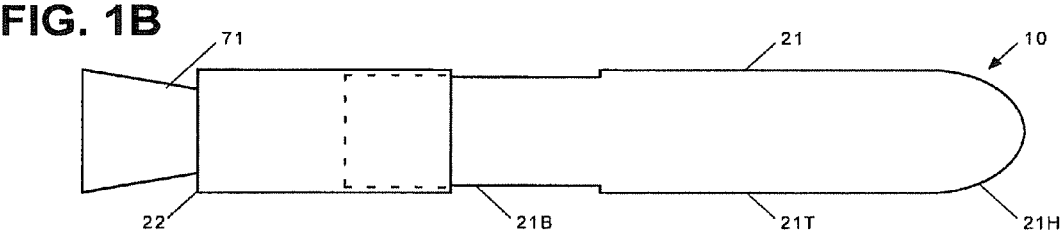

In another exemplary embodiment of this aspect of the invention and as described in FIG. 1B, an exemplary pelvic relaxing system 10 includes a body member 20 with a first unit 21 and a second unit 22, an actuator member disposed inside the body member 20 (thus not shown in this figure), and a control member with an input unit 71 and various other units incorporated inside the body member 20 (thus not shown in this figure). The first unit 21 is similar to that of FIG. 1A, and defines a head 21H, a trunk 21T, and a base 21B. An entire part or at least a part of the base 21B, however, is arranged to form a recess with a diameter and/or a thickness which may be less than that of a lumen (denoted by dotted lines) defined in a proximal part of the second unit 22. Therefore, such a body member 20 may be arranged to dispose the recessed part of the base 21B into and out of the lumen of the second unit 22, thereby effecting translational movements of the first unit of the body member 20. Similar to that of FIG. 1A, the second unit 22 of FIG. 1B is elongated and forms a shape and/or size to form the grip for the user, whether the user grabs the second unit 22 with his or her thumb pointing proximally, distally, and/or laterally.

The input unit 71 movably couples with a distal end of the second unit 22 and is also oriented so that an user may apply an user input thereto through at least an area of the input unit 71 vertically, horizontally, an at angle or angularly. The input unit 71 is also arranged to move between more than two states (preferably an off state, an on state, and at least one another state), thereby operating as conventional joysticks. As will be explained in greater detail below, such an input unit 71 is arranged to monitor various dynamic patterns of the user input such as, e.g., its movement effected by the user and to generate sensing signals based upon such dynamic patterns. The input unit 71 is also shaped and/or sized such that the user may manipulate the input unit 71 while grabbing or holding the second unit 22 whether the user grabs such a unit 22 with his or her thumb pointing proximally, distally, and/or laterally. More specifically, such an input unit 71 generates the sensing signals of which amplitudes, durations or other temporal and/or spatial patterns may be determined by various dynamic patterns of the user input for grabbing and holding the second unit 22. Accordingly, the user may control various features of pelvic relaxing operation while grabbing and holding such a second unit 22 during use and without having to change the grip of the second unit 22, without having to move the hand to reach the input unit 71 while holding or grabbing the second unit 22, and the like. Further details of input units of such a type are provided in conjunction with FIGS. 3I to 3S.

In operation, the first and second units 21, 22 are fixedly or movably coupled with each other to form the body member 20, and the system 10 is connected to an electric power outlet with a power supply cable (not shown in the figure) or provided with a battery. The user then inserts the head 21H of the first unit 21 into the pelvic cavity. When the user pivots, swivels or otherwise manipulates the input unit 71 and moves the input unit between different states, such an unit 71 begins to generate the sensing signals based upon one or more dynamic patterns of the user input and delivers the sensing signals to the control member which then manipulates an actuator member (not included in the figure). Based on dynamic characteristics thereof, the actuator member effects one or multiple movements of a single part or multiple parts of the body member 20 and/or one or multiple movements of at least a substantial part of the body member 20, thereby providing the same or different stimuli to one or more portions of the pelvic structure. In the embodiment of FIG. 1B, the actuator member is disposed inside the first and/or second units 21, 22 of the body member 20 and generates translation movement of the first unit 21 into and out of the second unit 22. Because the input unit 71 is disposed and oriented as described above, the user may effect different movements of the same or different parts of the body member 20 and may deliver the same or different stimuli to the same or different portions of the pelvic structure by simply supplying different user inputs through an at least substantial identical area of the input unit 71, without moving his or her hand and/or changing the grip for manipulating the input unit 71 and/or providing different user inputs thereto, without manually moving the body member 20 inside the pelvic cavity for contacting the same part of the body member 20 with different portions of the pelvic structure, and so on. Other configurational and/or operational characteristics of the system of FIG. 1B are similar or identical to those of FIG. 1A.

Figure 1C:
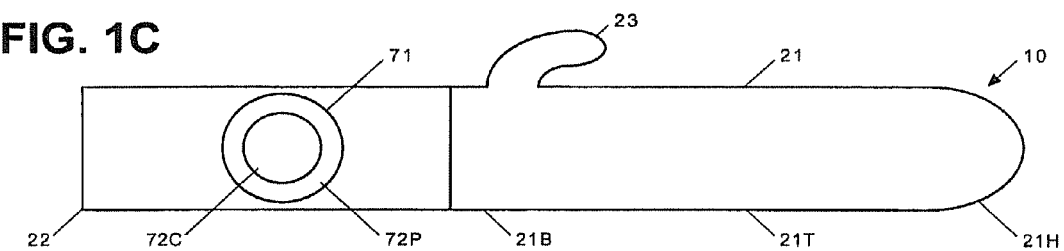

In another exemplary embodiment of this aspect of the invention and as described in FIG. 1C, an exemplary pelvic relaxing system 10 includes a body member 20 with a first unit 21 and a second unit 22, an actuator member disposed inside the body member 20 (thus not shown in this figure), and a control member with an input unit 71 and various other units incorporated inside the body member 20 (thus not shown in this figure). The first unit 21 is similar to that of FIG. 1A, and defines a head 21H, a trunk 21T, and a base 21B. In addition, the first unit 21 includes at least one bulge 23 which is formed in the base 21B and strategically shaped and/or sized to contact a clitoris of the pelvic structure. An entire part or at least a part of the bulge 23 is arranged to effect vibration and/or other movements so as to deliver stimuli to the clitoris. Similar to that of FIG. 1A, the second unit 22 of FIG. 1C is elongated and defines a shape and/or size to form the grip for the user, whether the user grabs the second unit 22 with his or her thumb pointing proximally, distally, and/or laterally.

The input unit 71 is movably disposed on a side of the second unit 22 and oriented such that an user may apply an user input thereto through at least an area of the unit 71 vertically, horizontally, an at angle, and/or angularly. Such an input unit 71 is also arranged to operate between more than two states (preferably an off state, an on state, and at least one another state), thereby operating as conventional direction-sensitive switches. As will be explained in greater detail below, such an input unit 71 is arranged to monitor various dynamic patterns of the user input such as, e.g., its movement effected by the user and to generate sensing signals based upon such dynamic patterns. The input unit 71 is also shaped and/or sized such that the user may manipulate the input unit 71 while grabbing or holding such a second unit 22 whether the user grabs such a unit 22 with his or her thumb pointing proximally, distally, and/or laterally. More specifically, the input unit 71 generates the sensing signals of which amplitudes, durations or other temporal and/or spatial patterns may be determined by various dynamic patterns of the user input for grabbing and holding the second unit 22. Accordingly, the user may control various features of pelvic relaxing operation while grabbing or holding the second unit 22 during use and without having to change the grip of the second unit 22, without having to move his or her hand to reach the input unit 71 while holding and grabbing the second unit 22, and the like. When desirable, the input unit 71 may define multiple areas such as a center area 72C and a peripheral area 72P each of which may be arranged to generate different sensing signals in response to the same or different user inputs, thereby allowing the user to control more features of pelvic relaxing operation. It is appreciated, however, that such multiple areas 72C, 72P may be arranged so that manipulating one of such areas 72C, 72P may result in manipulating the other thereof 72C, 72P, while keeping the same operation of the other area or changing the operation of the other area. In the exemplary embodiment of FIG. 10, the center or inner area 72C is arranged to move between multiple states independently of the peripheral or outer area 72P, while the outer area 72P is arranged to move between multiple states with the inner area 72C without affecting the operation selected by the inner area 72C. Accordingly, the user may supply different user inputs to the inner and outer areas 72C, 72P at least substantially independently. Other details of input units of such a type are to be provided in conjunction with FIGS. 3I to 3S.

In operation, the first and second units 21, 22 are fixedly or movably coupled with each other to form the body member 20, and the system 10 is connected to an electric power outlet with a power supply cable (not shown in the figure) or provided with a battery. The user then inserts the head 21H of the first unit 21 into the pelvic cavity. When the user pivots, swivels or otherwise manipulates the input unit 71 and moves the input unit between different states, such an unit 71 begins to generate the sensing signals based upon one or more dynamic patterns of the user input and delivers the sensing signals to the control member which then manipulates an actuator member (not included in the figure). When the input unit 71 includes multiple areas 72C, 72P, the user may also supply different user inputs to different areas 72C, 72P while keeping or changing operations determined by such areas 72C, 72P. Based on dynamic characteristics thereof, the actuator member effects one or multiple movements of a single part or multiple parts of the body member 20 and/or one or multiple movements of at least a substantial part of the body member 20, thereby providing the same or different stimuli to one or more portions of the pelvic structure. In the embodiment of FIG. 10, the actuator member is disposed in the body member 20, thereby effecting vibration or other movements of the bulge 23, in addition to various optional movements of at least a part of such a first unit 21. Because the input unit 71 is disposed and oriented as described above, the user may effect different movements of the same or different parts of the body member 20 and deliver the same or different stimuli to the same or different portions of the pelvic structure by simply supplying different user inputs through an at least substantial identical area of the input unit 71, without moving his or her hand and/or changing the grip for manipulating the input unit 71 and/or providing different user inputs thereto, without manually moving the body member 20 in the pelvic cavity for contacting the same part of such a body member 20 with different portions of the pelvic structure, and so on. When the input unit 71 defines multiple areas 72C, 72P, such an user may effect more diverse movements of the same or different parts of the body member 20 to deliver more diverse stimuli to the same or different portions of the pelvic structure. Further configurational and/or operational characteristics of the system shown in FIG. 10 are similar or identical to those of FIGS. 1A and 1B.

Figure 1D:
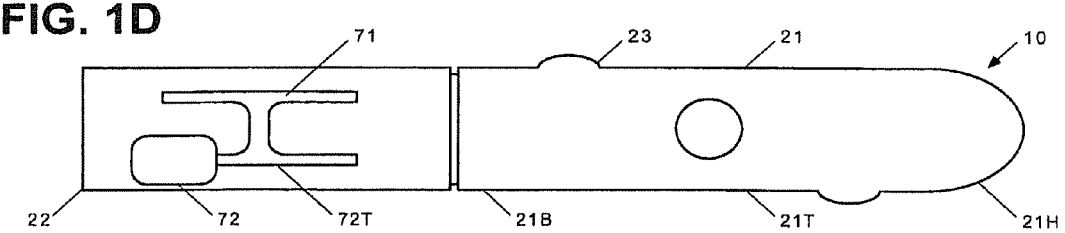

In another exemplary embodiment of this aspect of the invention and as described in FIG. 1D, an exemplary pelvic relaxing system 10 includes a body member 20 with a first unit 21 and a second unit 22, an actuator member disposed inside the body member 20 (thus not shown in this figure), and a control member with an input unit 71 and various other units incorporated inside the body member 20 (thus not shown in this figure). The first unit 21 is similar to that of FIG. 1A, and defines a head 21H, a trunk 21T, and a base 21B. In addition, the first unit 21 includes multiple bulges 23 which are defined about different parts of the body member 20 in various intervals and strategically shaped and/or sized to contact a G spot along the pelvic structure. More specifically, entire part or at least a part of such bulges 23 may be arranged to effect vibration and/or other movements so as to deliver stimuli to the G spot. Similar to that of FIG. 1A, the second unit 22 of FIG. 10 is elongated and defines a shape and/or size to define the grip for the user, whether the user grabs the second unit 22 with his or her thumb pointing proximally, distally, and/or laterally.

The input unit 71 includes a receiving area 72 and multiple tracks 72T and is disposed on a side of the second unit 22. More specifically, the input unit 71 has two parallel elongated tracks 72T which are connected to each other by a transverse track 72T. The receiving area 72 is movably disposed in the tracks 72T and moves along the tracks 72T in response to an user input applied to such an area 72 vertically, horizontally, an at angle, and/or angularly. The input unit 71 is also arranged to operate between more than two states (preferably an off state, an on state, and at least one another state) in such elongated tracks 72T. For example, the input unit 71 may generate a set of sensing signals for regulating an amplitude of movement as the receiving area 72 travels along one of such tracks 72T but generate another set of sensing signals for regulating a direction, duration or other dynamic features of movement as the receiving area 72 travels along another of such tracks 72T. As will be explained in greater detail below, the input unit 71 may be arranged to sense other dynamic patterns of the user input such as, e.g., force of the user input, its velocity, its acceleration, and other temporal and spatial patterns thereof. The input unit 71 is also shaped and/or sized such that the user may manipulate the receiving area 72 while grabbing or holding the second unit 22 whether the user grabs such a unit 22 with his or her thumb pointing proximally, distally, and/or laterally. Accordingly, the user may control various features of pelvic relaxing operation while grabbing or holding the second unit 22 during use and without having to change the grip of the second unit 22, without having to move his or her hand to reach the input unit 71 while holding and grabbing the second unit 22, and so on. Similar to that of FIG. 10, the input unit 71 may define multiple receiving areas such as a center area and a peripheral area each capable of generating different sensing signals in response to the same or different user inputs, thereby allowing the user to control more features of pelvic relaxing operation. Other details of input units of such a type are to be provided in conjunction with FIGS. 3T to 3X.

In operation, the first and second units 21, 22 are fixedly or movably coupled with each other to form the body member 20, and the system 10 is connected to an electric power outlet with a power supply cable (not shown in the figure) or provided with a battery. The user then inserts the head 21H of the first unit 21 into the pelvic cavity. When the user moves the receiving area 72 along a first track 72T, the input unit 71 generates the sensing signals based upon a position of the receiving area 72 on the track or another dynamic pattern of the user input and delivers such signals to the control member which manipulates an actuator member (not included in the figure). When a specific dynamic feature of the movement of the body member 20 attains a desirable state, the user may set such a setting by, e.g., pressing the receiving area 72 in a current position, activating a separate set button (not shown in the figure), and the like. The user may move the receiving area 72 to a second track 72T across the transverse track, move the area 72 along the second track 72, and set a new position when another dynamic feature of the movement of the body member 20 attains a desirable state. Based on dynamic characteristics thereof, the actuator member may effect one or multiple movements of a single part or multiple parts of the body member 20 and/or one or multiple movements of at least a substantial part of the body member 20, thereby providing the same or different stimuli to one or more portions of such a pelvic structure. In such an embodiment of FIG. 1D, the actuator member may effect vibration or other movements of at least a part of the first unit 21. Because the input unit 71 is disposed and oriented as described above, the user may effect different movements of the same or different parts of the body member 20 and then deliver the same or different stimuli to the same or different portions of the pelvic structure by simply supplying different user inputs through a single receiving area of the input unit 72, without moving his or her hand and/or varying the grip for controlling the input unit 71 and/or providing different user inputs thereto, without having to manually move the body member 20 in the pelvic cavity for contacting the same part of such a body member 20 with different portions of the pelvic structure, and the like. Other configurational and/or operational characteristics of the system of FIG. 1D may be similar or identical to those of FIGS. 1A to 1C.

Configurational and/or operational variations and/or modifications of the above embodiments of the exemplary systems and various members thereof described in FIGS. 1A through 1D also fall within the scope of this invention.

The body member and its units may be fabricated similar or identical to shapes and/or sizes of any conventional pelvic relaxing devices. Accordingly, the first unit may have various shapes, sizes, and curvatures which may be constant along an entire portion of a longitudinal axis of the first unit or may vary therealong. Further details of such shapes, sizes, curvature, and other configurations are provided in the above prior art patents and/or publications incorporated herein by reference. Similarly, the second unit may have various shapes, sizes, and curvatures which may also be constant along the entire portion of the axis or may also vary therealong. It is appreciated, however, that handles of the conventional pelvic relaxing devices are generally longer in order to accommodate a space for the grip and another space for incorporating various switches. In contrary, the pelvic relaxing system of this invention incorporates the input unit disposed in the same area as the grip therefor and, therefore, the second unit of such a system may typically be shorter than its conventional counterparts. Such a body member and its first and second units may also be made of and/or include materials as employed in any conventional pelvic relaxing devices. Accordingly, the first unit may be made of and/or include flexible or rigid materials, soft or hard materials, composite materials, and the like. When desirable, the first unit may be arranged to exhibit different mechanical properties in different parts thereof. The first unit may further form at least one internal lumen in which various members and/or units of the system may be disposed. The second unit may also be made of and/or include flexible or rigid materials, soft or hard materials, as long as such an unit may form the grip for the user.

Although the pelvic relaxing systems of FIGS. 1A to 1D exemplify combinations of various first units, second units, and input units, these units may be used in different combinations. For example, the first unit of the system of FIG. 1A may be coupled with the second unit of the system of FIG. 1B, and such a body member may include the input unit of FIG. 1D, and the like. In addition, such a system may incorporate different combinations of various actuator and control members as will be described in greater detail below.

Figure 2:
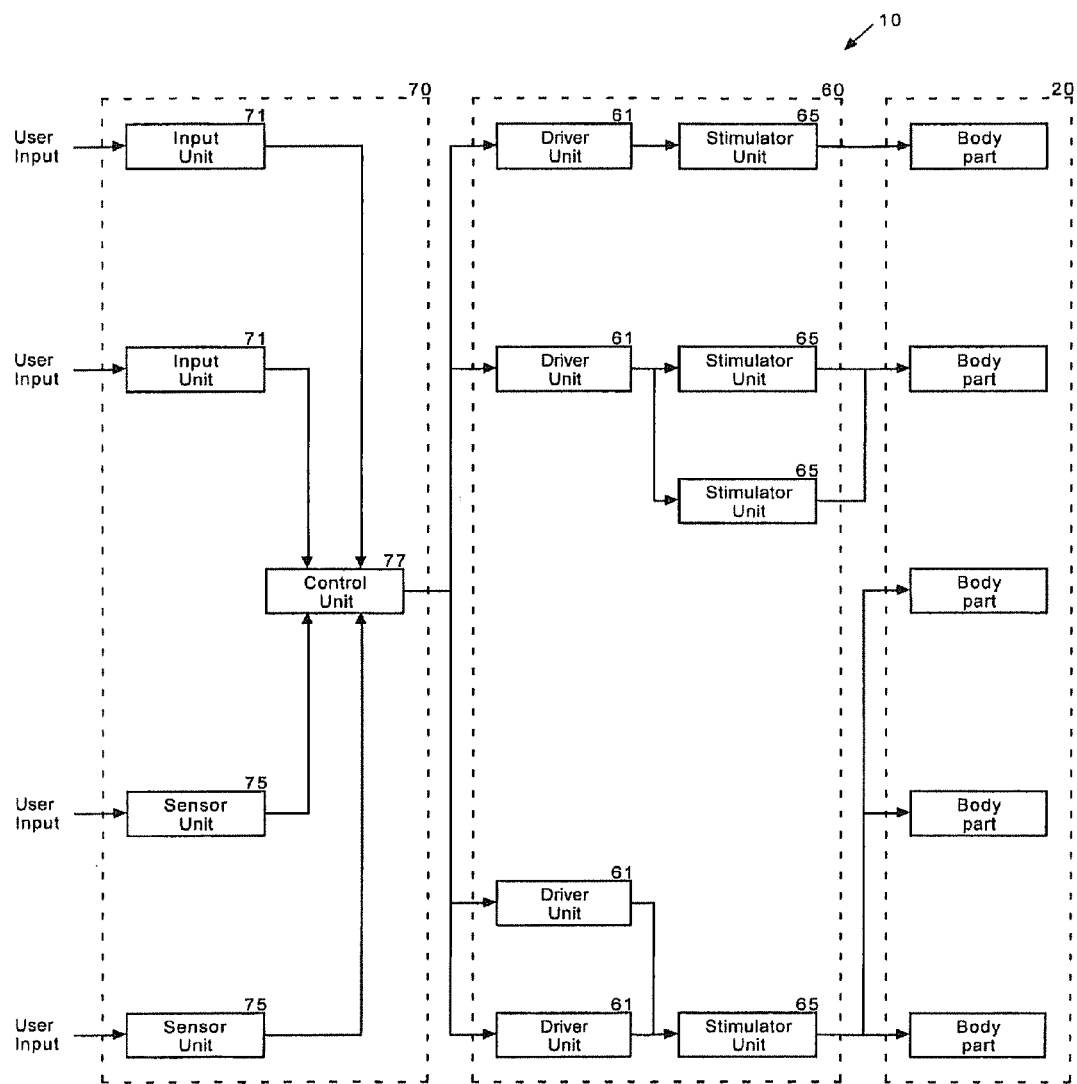
FIG. 2 is a schematic diagram of various functional members and units of an exemplary pelvic relaxing system according to the present invention.

In another aspect of the present invention, an exemplary pelvic relaxing system may include at least one body member, at least one actuator member, at least one control member, and at least one power (supply) member. FIG. 2 is a schematic diagram of various functional members and units of an exemplary pelvic relaxing system according to the present invention. A typical pelvic relaxing system 10 is comprised of at least one body member 20, at least one actuator member 60, at least one control member 70, and at least one power (supply) member (not included in the figure) which may be a wire and plug assembly for receiving AC power from an electric outlet or may instead be a dry-cell battery or a rechargeable battery.

As briefly described in FIGS. 1A to 1D, the body member 20 includes at least one first unit and at least one second unit, where the first unit defines various parts capable of contacting one or more portions of the pelvic structure when engaging therewith and providing various stimuli through one or more movements thereof. The body parts with various configurations are generally similar to those of the prior art devices, whereas various novel body parts are provided in the co-pending applications.

The actuator member 60 includes at least one driver unit 61 and at least one stimulator unit 65. The main function of the actuator member 60 is to effect one or multiple movements of one or multiple parts of the body member 20 (i.e., the body parts of the first unit thereof. To this end, the driver unit 61 receives electric power from the power member and generates driving force which is transferred to the stimulator unit 65 through at least one power transmission unit (not included in the figure). The driving unit 61 may be a conventional electric motor for generating rotational movement of its axle, an electromagnetic vibrator assembly for generating reciprocating movement of a mobile assembly. The rotational movement of the axle of the electric motor may be converted by various power conversion units to effect various driving forces. For example, a conventional gear unit may be utilized to adjust a speed of rotation and/or to vary a direction of rotational movement, a conventional eccentric flyweight may be employed to generate vibrational movement, a conventional conversion unit with a rotating disk and mobile arm may be used to convert the rotational movement of the axle into translational movement of the mobile arm, and the like. When the pelvic relaxing system is to effect multiple movements, such an actuator member 60 may also include multiple driver units 61 each of which may effect one or more of such movements either independently or in cooperation.

The stimulator unit 65 of the actuator member 60 is then arranged to receive the driving force, to optionally convert the driving force into actuating force, and then to effect desirable movement of a preset part of the first unit of the body member 20 by such actuating force. To this end, the stimulator unit 65 mechanically, electrically, and/or magnetically couples with the preset part of the body member 20 and ensures its actuating force to effect the desirable movement of the body part. In one example, such a stimulator unit 65 transmits the driving force from the driver unit 61 directly to the body part so that such movement of the body part is at least partially similar to that of the driver unit 61. In such an example, the actuating force is at least substantially identical to the driving force. In another example, the stimulator unit 65 may convert the driving force into the actuating force and transmits the force to the body part so that the movement of the body part is at least partially similar to that of the stimulator unit 65. In another example, the stimulator unit 65 transmits the actuating force to the body part by at least one power conversion unit effecting movement of the body part which may be at least partially different from that of the stimulator unit 65, depending on detailed mechanical conversion mechanism of the power conversion unit. The actuator member 60 may also include the power transmission unit which may transmit the driving and/or actuating forces from one to another locations inside the body member 20 while maintaining or changing amplitudes and/or directions of such forces. Such a power transmission unit may be any conventional articles of commerce capable of transmitting the rotational and/or translational movements therealong, where examples of such a power transmission unit may include, but not be limited to, assemblies of multiple axles coupled by one or more universal joints, rigid or flexible metal cables, and the like.

Such an actuator member 60 may also include one or multiple driver and/or stimulator units 61, 65 which may be operatively coupled to each other in various modes. In one example, a single driver unit 61 may be operatively coupled to a single stimulator unit 65 and deliver such driving force thereto. In another example, a single driver unit 61 may be operatively coupled to two or more stimulator units 65 and deliver the same driving force to multiple stimulator units 65 one at a time or simultaneously. It is appreciated that the actuator member 60 may include one or more power conversion units so as to deliver different driving forces to different stimulator units 65. In another example, two or more driver units 61 may be operatively coupled to a single stimulator unit 65 and deliver different driving forces to the stimulator unit 65 one at a time or simultaneously. When desirable, at least two of the driver units 61 may be arranged to drive the stimulator unit 65 simultaneously so as to effect compound actuating force.

Similarly, the actuator member 60 may be coupled to the body member 20 in various modes. In one example, a single stimulator unit 65 may operatively couple with a single body part and deliver the driving and/or actuating forces thereto. In another example, a single stimulator unit 65 may operatively couple with two or more body parts and deliver the same driving and/or actuating forces onto multiple body parts one at a time or simultaneously. It is appreciated that the actuator member 60 may include one or more power conversion units so as to deliver different actuating forces to different body parts one at a time or simultaneously. In another example, multiple stimulator units 65 may operatively couple with a single body part and deliver different driving and/or actuating forces to such a body part one at a time or simultaneously. When desirable, at least two of the stimulator units 65 may also be arranged to move the body part simultaneously so as to effect compound movement of such a part.

The actuator member 60 may manipulate various movements of the single part or multiple parts of the body member 20 by its single stimulator or multiple stimulator units 65 through various actuating forces. First of all, the actuator member 60 may be arranged to generate various types of movements of the single or multiple units (or their parts) of the body member 20. In one example, such an actuator member 60 may generate vibration of at least a substantial part of the first unit of the body member 20, vibration of at least one but not all of the head, trunk, and base of the first unit, vibration of the bulges designated for stimulating the clitoris. G-spot, pelvic wall, and so on. In another example, the actuator member 60 may generate translation of at least a substantial part of the first unit, translation of at least one but not all of the head, trunk, and base of the first unit, translation of the above bulges, and so on, where such translation may be effected through and/or around the pelvic opening for stimulating such clitoris. G-spot, pelvic wall, and so on, and where such translation may be parallel to, perpendicular to or at an angle with respect to the pelvic opening and/or the longitudinal axis of the first unit. In another example, the actuator member 60 may generate rotation or pivoting of at least a substantial part of the first unit, rotation or pivoting of at least one but not all of the head, trunk, and base of such a first unit, rotation or pivoting of such bulges, and the like. It is appreciated that such rotation or pivoting may be effected about the longitudinal axis of the first unit or, alternatively, may be effected about a center of rotation or an axis of rotation which may be formed in the first or second units of the body member 20. Accordingly, such rotation or pivoting may be effected about the clitoris. G-spot, and pelvic wall when desirable. In addition and depending on the location of such a center, the rotation or pivoting may be effected as swiveling of an entire part or only a part of the first unit. In another example, the actuator member 60 may generate tapping or thumping of at least a substantial part of the first unit, tapping or thumping of at least one but not all of the head, trunk, and base of the first unit, tapping or thumping of the bulges, and the like. Therefore, the actuator unit 60 may provide such tapping or thumping stimuli to the clitoris. G-spot, and pelvic wall. In another example, such an actuator member 60 may generate deformation of at least a substantial part of the first unit, deformation of at least one but not all of such head, trunk, and base of the first unit, deformation of one or more of the bulges, and the like. Further configurational details of such body and actuator members 20, 60 for effecting these movements are provided in the co-pending applications.

The control member 70 may include at least one control unit 77 and at least one of at least one input unit 71 and sensor unit 75. The main function of the control member 70 is to generate signals for manipulating various units of the actuator member 60. To this end, the input and/or sensor units 71, 75 may be arranged to receive various user inputs and to generate sensing signals in response thereto, while the control unit 77 may be arranged to generate control signals according to the sensing signals such that the actuator member 60 may generate the driving and/or actuating forces in response to the user inputs. Accordingly, the stimulator units 65 of the actuator member 60 may actuate the body part in order to deliver desired stimuli to a single portion or multiple portions of the pelvic structure. As will be explained in greater detail below, the input and sensor units 71, 75 basically refer to similar articles capable of receiving various user inputs and generating various sensing signals in response thereto. Within the scope of this invention, those articles incorporated into the first unit of the body member are to be referred to as the sensor units 75, whereas those incorporated into the second unit of the body member will be referred to as the input units 71, unless otherwise specified.

The input unit 71 may preferably receive various user inputs of different nature. For example, the input unit 71 may receive one or more of a mechanical input, an acoustic input, an electrical input, a magnetic input, an optical input, and so on, where the mechanical input may be provided by physical contact, where the acoustic input may be supplied through sound waves, where the electrical input may be provided by electric voltage, electric current, changes in such voltage, current, and electrical properties (including electric resistance and capacitance), where the magnetic input may be supplied by a permanent magnet and/or electromagnet, and where the optical input may be provided by visible light rays, ultraviolet rays, infrared rays, and so on.

Such an input unit 71 may receive and recognize various user inputs applied thereto in various dimensions. For example, the input unit 71 may generate different sensing signals in accordance with the user input applied in a single specific curvilinear direction (i.e., an unidirectional user input). Such an input unit 71 may move or deform between at least two (or three) states in accordance with such an user input and generate different sensing signals in accordance with the dynamic patterns of the user input. When the input unit 71 is designed to generate the sensing signals for controlling a single stimulator unit 65, the input unit 71 may be arranged to generate such sensing signals while changing their dynamic patterns in accordance with a position of the input unit 71 so that such a stimulator unit 65 may generate various actuating forces in response thereto. When the input unit 71 is designed to generate the sensing signals for controlling multiple stimulator units 65 or controlling multiple dynamic patterns of the actuating forces generated by the single stimulator units 65, the input unit 71 may then be arranged to generate multiple sets of sensing signals one at a time, where a first set of the signals may be generated when the input unit 71 may move or deform along or within a first portion of a track, whereas a second set of such signals may be generated when the input unit 71 may move or deform along a second portion of a track. Alternatively, the input unit 71 may remain stationary but generate different sensing signals in accordance with the dynamic patterns of the user input. When the input unit 71 is designed to generate the sensing signals for controlling a single stimulator unit 65, the input unit 71 may be arranged to generate such sensing signals while changing their dynamic patterns in accordance with the dynamic patterns of the user input (e.g., its amplitude, duration, and the like) so that such a stimulator unit 65 may generate various actuating forces in response thereto. When the input unit 71 is designed to generate the sensing signals for controlling multiple stimulator units 65 or controlling multiple dynamic patterns of the actuating forces generated by the single stimulator unit 65, the input unit 71 may be arranged to generate multiple sets of sensing signals one at a time, where a first set of the sensing signals may be generated when the user input may be applied in one direction, while a second set of such sensing signals may be generated when the input unit 71 may be applied in another direction. In general, such an unidirectional input device 71 may be constructed similar to any conventional input devices which may operate between at least three states which are defined along such a direction and which may operate between such states continuously or intermittently, and examples of such input units 71 may be, but not be limited to, a variable resistance switch, a switch with three or more contacts, and so on. It is appreciated that, regardless of their detailed mechanisms of operation, the input unit 71 is preferably arranged to receive different user inputs through at least a substantially identical area thereof.

In another example, the input unit 71 may generate different sensing signals in response to the user input which is applied along a direction defined on a curvilinear plane which is in turn defined by a pair of orthogonal or non-orthogonal axes (i.e., a two-dimensional user input), where such a pair of axes may correspond to any two axes of the Cartesian coordinate system, the cylindrical coordinate system, the spherical coordinate system, other non-orthogonal coordinate system, and so on. Such a curvilinear plane may also be defined parallel to, perpendicular to or at a preset angle with respect to a curvilinear surface of the second unit of the body member 20. Similar to the unidirectional input unit described in the previous paragraph, the two-dimensional input unit 71 may move or deform between multiple states defined on such a curvilinear plane in response to the user input and generate different sensing signals in response to dynamic patterns of the user input. When the input unit 71 is designed to generate sensing signals for controlling a single stimulator unit 65, the input unit 71 may be arranged to generate such signals while changing their dynamic patterns based upon a position of the input unit 71 on the two-dimensional plane as well as a direction of movement or deformation thereof on such a plane so that the stimulator unit 65 may generate various actuating forces in response thereto. When the input unit 71 is designed to generate the sensing signals for controlling multiple stimulator units 65 or controlling multiple dynamic patterns of the actuating forces generated by the single stimulator units 65, the input unit 71 may then be arranged to generate multiple sets of sensing signals one at a time or simultaneously, where a first set of the signals may be generated when the input unit 71 may move or deform along a first axis of the plane or may be moved to a first portion of the plane, while a second set of the signals may be generated when the input unit 71 may move or deform along a second axis of the plane or may be moved into a second portion of the plane. In the alternative, such an input unit 71 may remain stationary but generate different sensing signals in response to the dynamic patterns of the user input. When the input unit 71 is arranged to generate the sensing signals for controlling a single stimulator unit 65, the input unit 71 may generate sensing signals while changing their dynamic patterns based upon the dynamic patterns of the user input (e.g., its amplitude, direction, and the like) defined on the two-dimensional plane such that the stimulator unit 65 may generate various actuating forces in response thereto. When the input unit 71 is arranged to generate the signals for controlling multiple stimulator units 65 or controlling multiple dynamic patterns of such actuating forces generated by the single stimulator unit 65, the input unit 71 may be arranged to generate multiple sets of signals one at a time or simultaneously, where a first set of the sensing signals may be generated when the user input may be applied along one axis of the plane, and a second set of such sensing signals may be generated when the input unit 71 may be applied along another axis of the plane. In general, such a two-dimensional input device 71 may be constructed similar to any conventional input devices which may operate between multiple states along each of the pair of axes of the plane either continuously or intermittently, where at least two states are defined along each axis of the plane. Examples of such two-dimensional input units 71 may include, but not be limited to, a joystick, a touch pad, a track ball, and any conventional two-dimensional input devices. It is appreciated that, regardless of their detailed mechanisms of operation, such input units 71 are arranged to receive different user inputs through at least a substantially identical area thereof.

In another example, the input unit 71 may generate different sensing signals in response to the user input which is applied along a direction defined in a curvilinear space which is in turn defined by at least three orthogonal or non-orthogonal axes (i.e., a three-dimensional user input), where the axes may correspond to those of the Cartesian coordinate system, the cylindrical coordinate system, the spherical coordinate system, other non-orthogonal coordinate system, and the like. Similar to the two-dimensional input unit described in the above paragraph, the three-dimensional input unit 71 may move or deform between multiple states defined in the space as a response to the user input and generate different sensing signals based on dynamic patterns of the user input. Alternatively, the input unit 71 may be stationary but generate different sensing signals based upon the dynamic patterns of the user input. When the input unit 71 is stationary, it may be arranged to monitor various dynamic patterns of the three-dimensional user input without making any movement or deformation thereof. When such an input unit 71 is to move in response to the three-dimensional user input, however, it is not practical to construct the input unit 71 which may move freely in the three-dimensional space, for the input unit 71 typically couples with the second unit of the body member 20 in one way or another. Therefore, such an input unit 71 is preferably arranged to respond to the three-dimensional user input in various ways. In one example, the aforementioned two-dimensional input mechanism may be incorporated in another part which may move or deform in at least one direction with respect to the body member 20 such that the input unit may move or deform in a total of three orthogonal or non-orthogonal directions, where such a part may be arranged to translate horizontally or vertically, rotate, pivot, and the like.

As the input unit 71 is arranged to move or deform along more directions and/or to monitor the user inputs applied thereto along more direction, the input unit 71 may generate more sensing signals with different dynamic patterns, thereby enabling the control member 70 to eventually manipulate the actuator member in more different modes. However, it is preferred that such an input unit 71 may be arranged to receive different user inputs through at least a substantially identical area thereof so that the user may be able to effect all of such movements of a single or multiple parts of the body member, without requiring the user to change the grip or to move his or her hand. In addition, such an input unit 71 may operate or move between multiple states continuously while generating such sensing signals with the dynamic patterns which also change continuously between such states. In the alternative, such an input unit 71 may operate or move between multiple states intermittently while generating the sensing signals of which the dynamic patterns also change by preset increments.

When the user applies different user inputs to a single receiving area of such an input unit 71 which then generates sensing signals for controlling multiple dynamic patterns of the actuating forces generated by the actuator member, it is preferable that the user set specific values for each of such dynamic patterns. This feature becomes essential when the input unit 71 may be arranged to receive multi-dimensional user inputs applied to the single receiving area thereof. To this end, the input unit 71 may include at least one setting mechanism so that the user may manipulate the receiving area of the input unit 71 to a desired position and set the value for a first dynamic pattern before the user moves on to manipulate the receiving area to another position for a second dynamic pattern. In one example, the control member 70 may include at least one set button which may operatively couple with the input unit 71 and may set such an unit 71 to generate a specific sensing signal when activated by the user. Depending on a number of different dynamic patterns, the control member 70 may include multiple set buttons each designated for each of multiple dynamic patterns, the button may be arranged to move in different directions each designated for each of such dynamic patterns, the button may be arranged to set the value for different dynamic patterns sequentially as the button may be activated repeatedly. In another example, the input unit 71 may be arranged to set the value for a specific dynamic pattern when such an unit 71 is positioned in a specific location and/or supplied with the user input in a preset direction for more than a preset period of time. In another example, the input unit 71 may be arranged to move in an auxiliary direction for setting the values of such dynamic patterns, where the auxiliary direction may be different from one or multiple directions in which the input unit 71 operates to vary its states. For example, an entire part of the joystick-type input unit 71 may move or deform in a direction which is different from one or multiple directions in which the joystick-type input unit 71 may move or deform for different values of such dynamic patterns of the user input. In addition, the value set for a specific dynamic pattern may be undone in various modes such as, e.g., by setting a different value for the same dynamic pattern, by changing an operating value of the dynamic pattern, and the like.

As described above, the input unit 71 may be arranged to recognize various dynamic patterns of the user input. In general, the dynamic patterns refer to both temporal patterns and spatial patterns of the user input. For the stationary input unit 71, the temporal patterns may include, but not be limited to, a duration of the user input, a frequency thereof, a temporal sequence thereof, and other temporal variables which may render one user input distinguished from another, while the spatial patterns may include, but not be limited to, an amplitude of such an user input, a direction thereof, and a type thereof which may also include at least one of vibration, horizontal translation, vertical translation, transverse translation, angular rotation, rotation about a center of rotation and/or an axis of rotation defined in the body member, swiveling, tapping, deformation, and the like. For the mobile input unit 71, the temporal patterns may alternatively include a duration of the user input, its frequency, its temporal sequence, its temporal rate of change (or acceleration), other temporal variables, and a compound value which may be obtained through at least one of mathematical manipulation of at least one of such, while the spatial patterns may include, but not be limited to, an amplitude of such an user input, its direction, its type, its displacement (or its integral over time) caused thereby, and a compound value which may be obtained through at least one of mathematical manipulation of at least one of the above, where examples of the mathematical manipulations may include, but not be limited to, differentiation of the above with respect to time, integration thereof over time, arithmetic or geometric averaging of the above over time without or with weighting factors, a product or ratio of at least two of such, a sum or difference between at least two of such, and the like. Such an user input may also include a presence and/or an absence of a mechanical, electrical, optical or magnetic contact between the user and input unit.

All of such input units 71 may be arranged to monitor one or more specific dynamic patterns of different user inputs. In one example, the input unit 71 may monitor force (or pressure) applied thereto by the user in one or multiple directions and generate the sensing signals in response to an amplitude of the force or pressure, its direction, its duration, its temporal or spatial sequence, and its compound value obtained as described above. The input unit 71 may be constructed similar to any conventional force or pressure sensors and/or transducers. When applicable, the input unit 71 may monitor torque applied thereto by the user thereabout and generate such sensing signals in response to an amplitude thereof, its direction, its duration, its temporal or spatial sequence, and its compound value. In another example, the input unit 71 may sense velocity of its movement which is effected by the user input and generate the signals in response to an amplitude of the velocity, its direction, its duration, its temporal or spatial sequence, its compound value, and the like. In another example, such an input unit 71 may monitor acceleration of its movement and/or displacement thereof each effected by the user input and generate the sensing signals in response to an amplitude of the acceleration, its direction, its duration, its temporal or spatial sequence, and its compound value. It is to be understood that the acceleration or displacement may be directly monitored by the input unit 71 or may be derived by differentiating or integrating the above velocity with respect to time. In another example, the input unit 71 may monitor mechanical, electrical, magnetic, and/or optical contact with the user in order to generate the sensing signals in response to an area of the contact, an amplitude thereof (in case of monitoring its force), its direction, its duration, its temporal or spatial sequence, and its compound value. In another example, the input unit 71 may monitor acoustic waves and/or electromagnetic waves propagating theretoward and generate the sensing signals in response to amplitudes (e.g., its instantaneous or average value) of such waves, a source of such waves (e.g., user or third party), a distance to such a source, its temporal or spatial sequence, and its compound value. It is appreciated that the input unit 71 may use a clock or a timer to monitor any of the above durations.

It is to be understood that the input unit 71 of this invention is characterized to allow the user to reach and to manipulate such with at least one finger thereof while simultaneously manipulating and/or holding the second unit with her or his hand during use without having to move the hand with respect to the second unit. When desirable, the control member may also include at least auxiliary input unit in addition to the above input unit, where the auxiliary input unit may also receive similar or different user inputs, may be disposed adjacent to or spaced away from the above input unit, and the like. Such an auxiliary input unit may be a conventional on/off switch, a conventional speed control switch, and the like.

Depending upon the dynamic patterns of the user input, the control member 70 may then issue various control signals which may effect different movements of the single part or multiple parts of the body member 20 through its single or multiple stimulator units 65. In one example, the control member 70 may turn on and off a stimulator unit 65 for vibration of an entire or preset part of the body member 20, may increase or decrease a speed of rotation of such a stimulator unit 65, may change a direction of rotation of the stimulator unit 65, and the like, where such vibration may be targeted for the clitoris, G-spot, and/or other portions of the pelvic wall. In another example, the control member 70 may turn on and off a stimulator unit 65 for translation of an entire or preset part of the body member 20, may increase or decrease a speed of translation, may change its direction of translation, may manipulate its distance of translation, and so on, where such translation may be targeted for the clitoris. G-spot, and/or other portions of the pelvic wall. In another example, the control member 70 may also turn on and off a stimulator unit 65 for rotating or pivoting an entire or preset part of the body member 20, may increase or decrease a speed of rotation or pivoting, may change its direction of rotation or pivoting, may manipulate its angle of rotation or pivoting, and so on, where such rotation or pivoting may also be targeted for the clitoris, G-spot, and/or other portions of the pelvic wall. As the actuator member 60 includes multiple stimulator units 65 and/or the body member 21 includes multiple parts capable of delivering various stimuli, the control member 70 may control each of such stimulator units 65 and/or parts for manipulating different movements of the single or multiple preset parts simultaneously or one at a time.

The control member 70 may be arranged to issue the control signals for selecting one or more of multiple stimulator units 65, one or more of multiple body parts, one or more of the portions of such a pelvic structure, and the like. In addition, the control member 70 may be arranged to generate such control signals for selecting one or more of multiple movements of such body part(s), one or more of their dynamic patterns, and the like. When desirable, the control member 70 may be arranged to issue the control signals for effecting a preset temporal pattern and/or a spatial pattern of such movements, a preset temporal sequence and/or a spatial sequence of such movements, and the like. The control member 70 may also issue further control signals for recording a temporal and/or spatial sequence of such movements provided by the user during use, for editing, selecting, and/or playing a pre-recorded temporal and/or spatial sequence of the movements, for resetting a temporal and/or spatial sequence, and the like. The control member 70 may further issue the control signals for changing configuration of the first unit, selecting one or more of various configurational changes, moving the preset body part to one of multiple preset positions along the first unit, playing or stopping audible sounds, selecting one of multiple pre-recorded audible sounds, synchronizing such movements with one or more of internal and/or external signals, and the like, where details of the above operations are provided in detail in the co-pending applications.

The control member 70 may effect various movements of the single part or multiple parts of the first unit of the body member 20 in various modes, where such movements may then be classified into at least one default movement and at least one selected movement. The default movement may refer to a movement which is to be effected whenever the actuator member 60 is initiated. Such a default movement may be set by a manufacturer and/or may be selected by the user of the system 10. Such a default movement may be a preset time-invariant movement or may instead be the movement varying at least one of its dynamic features over time. When desirable, the default movement may be set as a null movement, i.e., no movement. The selected movement may refer to a movement which is selected by the control member 20 in response to the user input. Such a selected movement may be effected independently of the default movement through a part of the body member 20 which is different from another part of the body member 20 which effects the default movement and/or may be effected onto a portion of the pelvic structure which is different from another portion of such a structure onto which the default movement is provided. In the alternative, the selected movement may be superposed onto and/or combined with the default movement in order to result in a compound movement.

The control member 70 may then effect either the default movement or the selected movement in various modes with respect to a first instance of receiving the user input. For example, the control member 70 may be arranged to start the movement immediately at the first instance, to gradually start the movement from the first instance, to start the movement only in a period after the first instance or to start the movement at another instance determined by the user input. The control member 70 may effect the movement in various modes with respect to a second instance of cessation of receiving the user input. For example, the control member 70 may be arranged to stop the movement immediately at the second instance, to gradually stop the movement from the second instance, to stop the movement only in a period after the second instance or to stop the movement at another instance determined by the user input. In the alternative, the control member 70 may maintain the movement only for a preset period which is determined by the first instance but is rather independent of the second instance.

The control member 70 may be arranged to issue the control signals for repeating a sequence of one or multiple movements of a single part or multiple parts of the body member 20, where such a sequence may be provided by a manufacturer, may be randomly generated by the control member 70, may be provided by editing a sequence pre-existing in the control member 70, may be provided by the user and stored in the control member 70, and so on. Such a sequence may be a temporal sequence and/or a spatial sequence. The control member 70 may initiate and terminate the repeating operation in various modes. In one example, the control member 70 may perform repetition when the user input is supplied to a certain input unit designated for such repetition. In another example, the control member 70 may perform repetition when the user input exceeds a preset threshold, e.g., when the user input is provided longer than a preset period, when an amplitude of the user input exceeds a threshold, and the like. Such movement or its sequence may be repeated for a preset period, for a preset number of times, for a period determined by the user input, for a number of times determined by the user input, or until another user input is provided.

As described in detail above, the actuator member 60 may then be arranged to effect various movements of the single or multiple parts of the body member 20 in response to control signals which are to be generated by the control member 70 in response to the user inputs. Such movements of the body part may be characterized by dynamic features thereof which may be temporal features and/or spatial features. Examples of such temporal features may include, but not be limited to, a duration of a specific movement, its frequency, its temporal sequence, one or multiple movements of a preset part or different parts of the body member 20 which may be arranged in a preset sequence or a sequence which may be at least partially determined by such an user input, and so on. Examples of such spatial features may similarly include, but not be limited to, an amplitude of the movement (or displacement), its direction, its type (such as, e.g., simple vibration, horizontal translation, vertical translation, transverse translation, angular rotation, rotation about a center of rotation or an axis of rotation defined in such a body member 20, swiveling, tapping, thumping, deformation, and the like), one or multiple movements of a preset part or different parts of the body member 20 while contacting a preset portion or different portions of the pelvic structure, and the like.

In contrary to various input devices of conventional pelvic relaxing devices, such input units 71 of this invention are preferably arranged to allow the user to manipulate dynamic features of various movements of a single part or multiple parts of the body member 20 without requiring the user to move her or his hand and without changing the grip. To this end, the input units 71 are preferably arranged to allow such an user to control at least one temporal feature of such movements, at least one spatial feature of such movements, and/or at least one configuration of the first unit of the body member 20. It is, therefore, appreciated that simply turning on and off (or off and on) the actuator member 60 may not be deemed as manipulating the temporal or dynamic feature of the movement of the body part, for the user then has to manipulate another input device to manipulate further details of the movement of the body part. In this context, the input device which is only capable of turning on and off (or off and on) the actuator member 60 may not qualify as the input unit within the scope of the present invention. Similarly, simply varying (i.e., increasing or decreasing) a speed and/or a direction of rotation effected by the actuator member 60 may not be deemed as manipulating the temporal or dynamic feature of the movement of the body part for the similar reason, while the input device which capable of effecting a change in the speed of rotation and/or direction of rotation of the actuator member 60 may not qualify as the input unit 71 within the scope of this invention. In addition, simply changing (i.e., increasing or decreasing) a distance and/or a speed of translation effected by the actuator member 60 may not be deemed as manipulating the temporal or dynamic feature of the movement of such a body part for the similar reason, and the input device which is only capable of effecting a change in the distance and/or speed of translation of the actuator member 60 may not qualify as the input unit 71 within the scope of the present invention. In this context, varying a speed of any movements of the single part or multiple parts of such a body member 20 between at least two substantially identical portions of such a pelvic structure may not be deemed as manipulating the temporal or dynamic feature of the movement, and any input device only capable of effecting a change in such a speed may not qualify as the input unit 71 within the scope of this invention.

As described in the co-pending applications, various pelvic relaxing systems of this invention may be arranged to change at least one configuration thereof, where examples of the configurations may include, but not be limited to, lengths of various units of the body member 20, diameters thereof, widths or heights thereof, curvatures thereof, surface textures thereof, and the like. It is appreciated that simply changing the length of the first part inserted into the pelvic cavity effected by the actuator member 60 may not be deemed as changing the configuration of the body member 20 for the similar reason, while the input device 71 which is only capable of effecting a change in such a length of the body member 20 may neither qualify as the input unit 71 within the scope of the present invention.

Figure 3A:
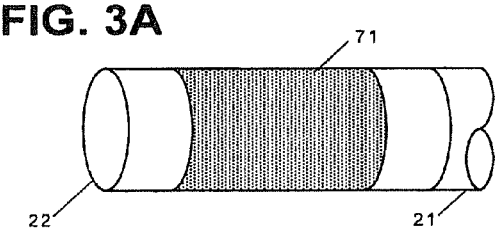
FIGS. 3A to 3H are perspective views of exemplary input units for monitoring a contact and/or a force of an user input according to the present invention.
Figure 3E:
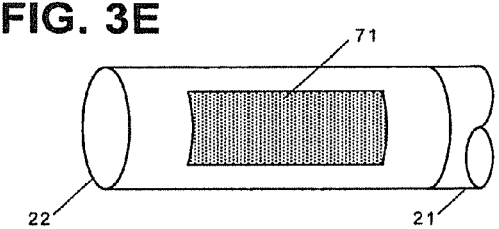
Figure 3B:
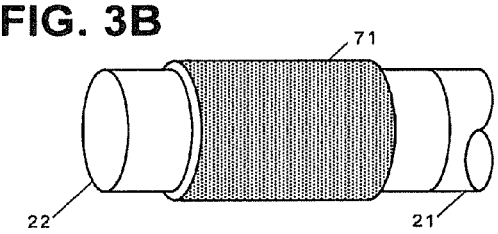
Figure 3F:
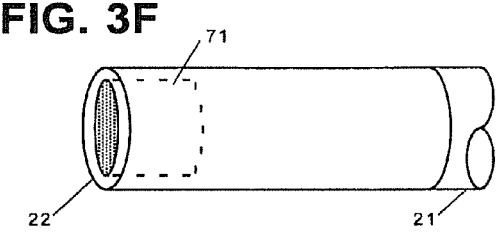
Figure 3C:
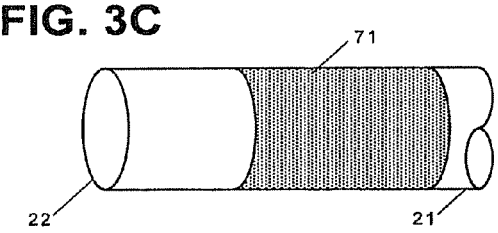

In another aspect of the present invention, the control member may include variable resistance input units capable of generating various sensing signals. FIGS. 3A to 3H show perspective views of exemplary input units for monitoring a contact and/or a force of an user input according to the present invention. It is to be understood that each figure includes an exemplary second unit of a body member which is coupled to an exemplary first unit of the body member. In one example of FIG. 3A, an input unit 71 is disposed around a middle of a second unit 22 of a body member. Such an input unit 71 is also flush with a surface of the second unit 22. In general, the input unit 71 is made of and/or includes an article of which an electrical resistance may change in response to one or multiple dynamic patterns of the user input examples of which may include, but not be limited to, force accompanying the user input, an area of contact, and so on. Such an input unit 71 may be made of a conventional conductive foam or sponge including conductive particles dispersed in a polymeric matrix. In this context, this input unit 71 may be viewed as a collection of multiple sensors. Such an input unit 71 may also be constructed by disposing an array of multiple electric contacts such that the electrical resistance of the input unit 71 may vary with a number of such contacts closed by the user input. In either of these examples, the input unit 71 may be arranged to generate a sensing signal based upon an average electrical resistance thereof. In the alternative, the input unit 71 may be arranged to generate sensing signals denoting a spatial distribution of the electrical resistance so that the control member may generate various control signals based upon an average electrical resistance or such spatial distribution. In a related example of FIG. 3B, an input unit 71 is similar to that of FIG. 3A, except that the input unit 71 may be raised above the surface of the second unit 22. Conversely, the input unit 71 may instead be disposed in a groove or an indentation. In other related examples of FIGS. 3C and 3D, input units 71 may be similar to those of FIGS. 3A and 3B but disposed in a proximal end of the second unit 22 (FIG. 3C) or in a distal end of such a unit 22 (FIG. 3D). In another related example of FIG. 3E, an input unit 71 is similar to that of FIG. 3A but disposed in a smaller area defined on a side of the second unit 22. In another related example of FIG. 3F, an input unit 71 is similar to that of FIG. 3A but disposed substantially in a distal end of the second unit 22. It is appreciated in such examples that at least a substantial area of each of the input units 71 preferably serves as an area for receiving the user input. Other characteristics of such input units 71 of FIGS. 3B to 3F are similar or identical to those of FIG. 3A.

Figure 3G:
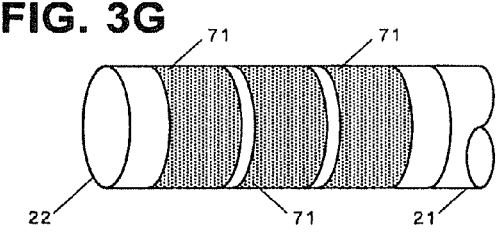
Figure 3D:
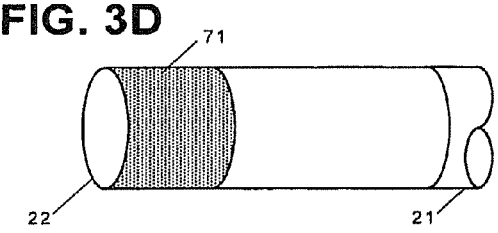
Figure 3H:
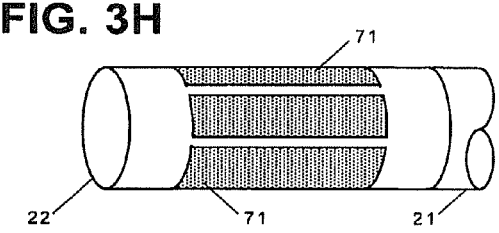

In another example of FIG. 3G, multiple input units 71 are disposed around the middle of such a second unit 22 side by side and along a longitudinal axis of the second unit 22 while being separated from each other by preset distances. Each of such input units 71 is similar or identical to that of FIGS. 3A and 3B, except that those units 71 generally define less widths or heights. In a related example of FIG. 3H, multiple input units 71 may be disposed along the middle of the second unit 22 side by side but perpendicular or normal to such a longitudinal axis of the second unit 22, where each input unit 71 is similar or identical to that of FIG. 3E. Each of such multiple input units 71 may be arranged to generate different sensing signals to enable the control member to manipulate different dynamic features of the movement of the body part. In the alternative, the control member may receive multiple sensing signals from such input units 71 and generate the control signals based upon an average of such signals.

Configurational and/or operational variations and/or modifications of the above embodiments of the exemplary systems and various members thereof described in FIGS. 3A through 3H also fall within the scope of this invention.

The variable resistance-type input units may have various shapes, sizes, and orientations, and may be fixedly or releasably coupled the second unit. Accordingly, such input units may be disposed over an entire part or only a part of the second unit, and may be arranged to cover a distal part and/or a proximal part of the second unit. The input units may also be arranged to move along the longitudinal axis of the second unit or to rotate angularly or radially around the surface of the second unit.

As described above, the variable resistance-type input units inherently have multiple sensors therein, where such sensors may sense force applied thereto, contact with the user, and so on. The input unit may be arranged to generate the sensing signals which may be an average of such signals generated by multiple sensors or such signals which represent the spatial distribution of the force or contact. In the latter embodiment, the control member may be arranged to monitor temporal change in such spatial distribution and then to derive therefrom, a direction of the user input, its velocity and/or acceleration, and the like.

The control member may include multiple input units having variable electrical resistance which may be disposed in any arbitrary pattern, e.g., those arranged longitudinally, radially, angularly, and so on. It is appreciated, however, that such input units may preferably allow the user to manipulate such without changing the grip and without moving her or his hand. Accordingly, such input units may be disposed in the area of the second unit which also forms the grip for the user. When desirable, such input units may be arranged to generate the sensing signals as long as they are supplied with various user inputs such as force, contact, and the like.

In another aspect of the present invention, the control member may include direction-sensitive input units capable of generating various sensing signals in response to directions and optionally other dynamic patterns of user inputs. FIGS. 3I through 3S are perspective views of exemplary input units capable of monitoring a direction, amplitude, and/or other dynamic patterns of an user input according to the present invention. It is appreciated that each figure shows an exemplary second unit of a body member which is coupled to an exemplary first unit of the body member.

Figure 3I:
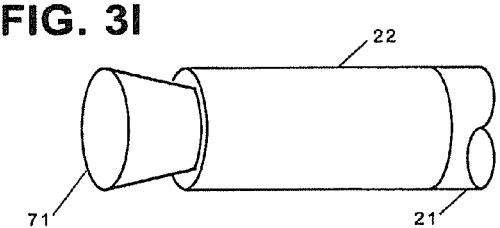
FIGS. 3I to 3S are perspective views of exemplary input units for monitoring a direction and/or an amplitude of an user input according to the present invention.

In one example of FIG. 3I, an input unit 71 is movably incorporated into a distal end of a second unit 22 of a body member. Such an input unit 71 is arranged to receive the user input through its top surface and/or its side while pivoting about the longitudinal axis of the second unit 22, translating with respect to a distal end of the second unit 22, and/or deforming at least a part thereof. Therefore, the input unit 71 may generate different sensing signals in response to a direction of the user input. Such an input unit 71 may also generate different sensing signals in response to other dynamic patterns of the user input such as, e.g., force of the user input, its duration, a displacement of such an input unit 71 effected by the user input, its velocity effected thereby, its acceleration effected thereby, an area of the input unit 71 receiving the user input, and the like. In the alternative, the input unit 71 may rather remain stationary, while monitoring the user input and generating different sensing signals in response to at least some of the above dynamic patterns of the user input. Examples of the input units 71 of the above embodiments may include, but not be limited to, conventional joysticks, touch pads, and the like. When desirable, the input unit 71 may also be arranged to be sense the force and/or contact effected along a direction which may be different from the above directions and to generate different sensing signals. For example, the input unit 71 may be translated and/or pressed toward and away from the second unit 22 in addition to its pivoting movements, while generating each set of signals based upon a state or position of the input unit 71 along the longitudinal axis of the second unit 22. In this context, such an input unit 71 may be viewed as the above variable resistance input unit or also as a collection of multiple sensors. Such an input unit 71 may also be constructed by disposing an array of multiple electric contacts so that the electrical resistance of the input unit 71 may change with a number of the contacts closed by the user input. In either of these examples, the input unit 71 may also be arranged to generate sensing signals in response to various dynamic patterns of the user input based upon its average electrical resistance. Alternatively, the input unit 71 may generate sensing signals denoting a spatial distribution of the electrical resistance such that the control member may generate such control signals based on an average electrical resistance or such spatial distribution. In a related example of FIG. 3J, an input unit 71 is similar to that of FIG. 3I, except that the input unit 71 may be coupled to the second unit 22 through a coupler 73C at least a part of which may be exposed. The coupler 73C may then be arranged to facilitate pivoting and/or translation movements of the input unit 71 with respect to the distal end of the second unit 22. In a related example of FIG. 3K, an input unit 71 is similar to that of FIG. 3J, except that such an unit 71 defines a grooved receptacle 73G for receiving a finger of the user therein, thereby providing the firmer grip thereto. Other characteristics of such input units 71 of FIGS. 3J to 3L are similar or identical to those of FIG. 3I. In another related example of FIG. 3L, an input unit 71 is disposed inside a hole or an indentation defined in the distal end of the second unit 22 so as to allow the user to insert her or his finger into the indentation and to manipulate such an input unit 71. Other characteristics of the input unit 71 of FIG. 3M are similar or identical to those of FIGS. 3I to 3L.

Figure 3M:
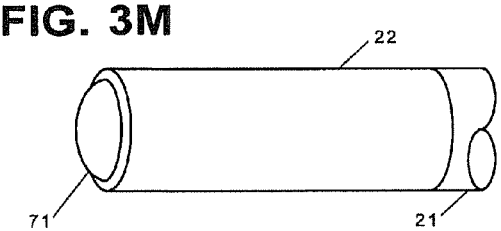
Figure 3J:
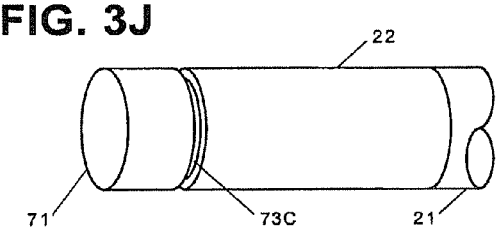

In another example of FIG. 3M, another input unit 71 may be incorporated into the distal end of the second unit 22 and receives the user input thereby. Such an input unit 71 may be moved or rolled by such user inputs and generate different sensing signals in response to the force, direction, and/or other dynamic patterns of such user inputs, similar to conventional track ball-type input devices. In the alternative, the input unit 71 may remain stationary but generate different sensing signals in response to the direction and/or other dynamic patterns of the user inputs, similar to the conventional touch pad-type input devices. Such a track ball-type and/or touch pad-type input unit 71 may also be arranged to rotate, translate or otherwise move or deform in a different direction so that the input unit 71 may also generate different sets of the sensing signals depending upon the position of the input unit 71 along the direction. Other characteristics of the input unit 71 of FIG. 3M are similar or identical to those of FIGS. 3I to 3L.

Figure 3N:
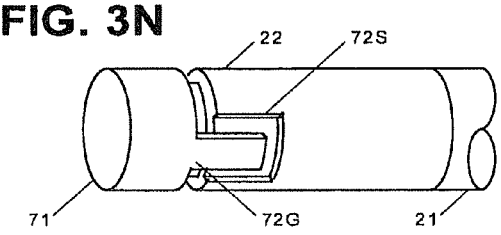
Figure 3K:
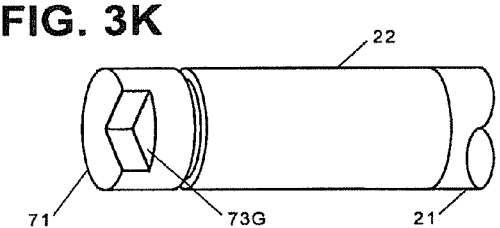
Figure 3O:
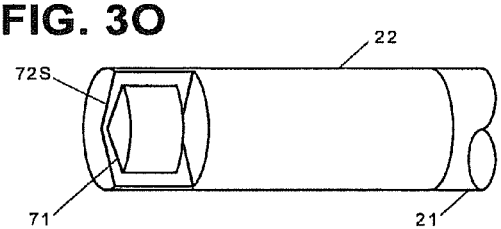
Figure 3L:
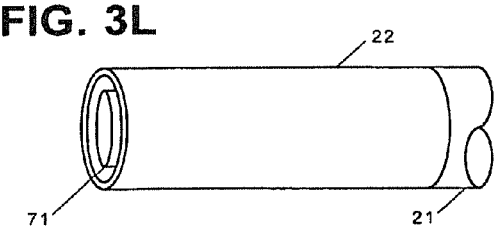

In another example of FIG. 3N, an input unit 71 may be movably coupled to the distal end of the second unit 22 and operates between multiple states similar to those of FIGS. 3I to 3M. The input unit 71 defines an elongated guide 72G which is movably received by a stop 72S defined on a side of the second unit 22. Such an input unit 71 is also arranged to translate toward and away from the second unit 22 during which the guide 72G of the input unit 71 is guided by the stop 72S of the second unit 22. Except such a guiding mechanism, such an input unit 71 is similar to that of FIGS. 3I to 3L. In a related example of FIG. 3O, another input unit 71 is movably disposed in one corner of the second unit 22 and receives the user input thereby. Such a corner defined in the second unit 22 is shaped and sized to allow the input unit 71 to translate, pivot or otherwise move while being confined by stops 72S formed on the corner. Other characteristics of such input units 71 of FIGS. 3N and 3O are similar or identical to those of FIGS. 3I to 3M.

Figure 3P:
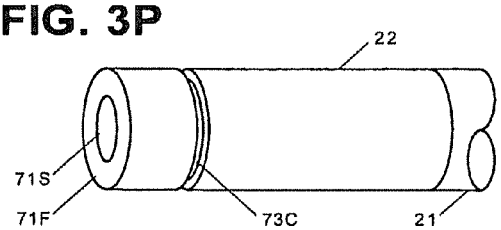

In another example of FIG. 3P, two input units 71F, 71F each of which is typically similar to that of FIG. 3J are disposed concentrically in the distal end of the second unit 22 in order to define multiple areas for receiving different user inputs. As described in conjunction with FIG. 1C, such areas of the input units 71F, 71S may be arranged so that manipulating one of the areas may result in manipulating the other thereof, while keeping the same operation of the other area or changing the operation of the other area. Such an interdependent mechanism may be easily embodied by mechanically coupling the input units 71F, 71S to move in unison or cooperation. Other characteristics of the input unit 71 of FIG. 3P are similar or identical to those of FIGS. 3I to 3O.

Figure 3Q:
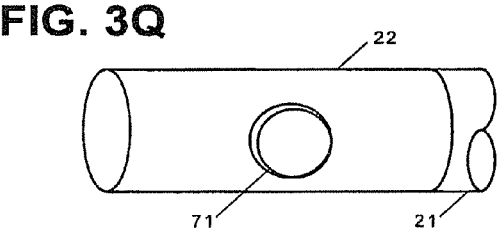
Figure 3U:
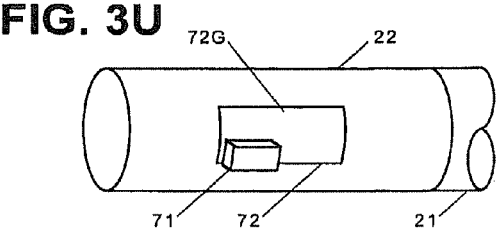
FIGS. 3T to 3X are perspective view of exemplary input units moving along tracks in response to a direction and/or amplitude of an user input according to the present invention.
Figure 3R:
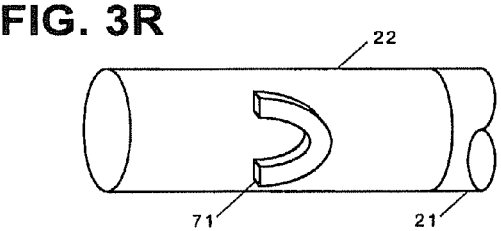
Figure 3V:
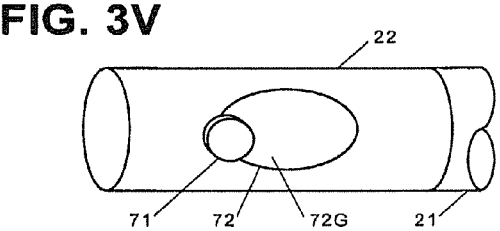
Figure 3S:
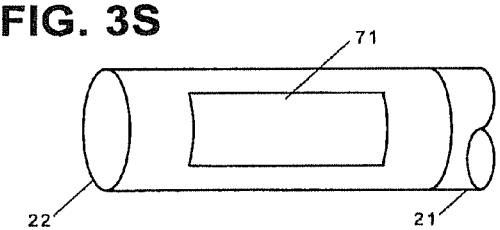
Figure 3W:
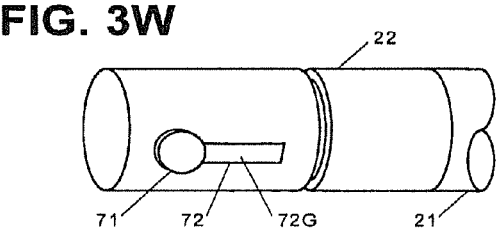

In another example of FIG. 3Q, an input unit 71 is disposed on a side of the second unit 22 and receives the user input with or without making movement thereof in response thereto. In general, the input unit 71 is similar to those of FIGS. 3I, 3J, and 3L, except its disposition on the side of the second unit. In a related example of FIG. 3R, an input unit 71 is similar to that of FIG. 3Q, except that such an unit 71 defines the grooved receptacle for receiving a finger of the user therein, thereby providing the firmer grip thereto. In a related example of FIG. 3S, an input unit 71 is also disposed on the side of the second unit 22 and operates similar to conventional touch pads. Other characteristics of the input unit 71 of FIGS. 3Q to 3S are similar or identical to those of FIGS. 3I to 3P.

In another aspect of the present invention, the control member may include input units moving along guides for generating different sensing signals in response to user inputs through such guides. FIGS. 3T to 3X show perspective view of exemplary input units moving along tracks in response to a direction and/or an amplitude of an user input according to the present invention. It is appreciated that each figure includes an exemplary second unit of a body member which is coupled to an exemplary first unit of the body member.

Figure 3T:
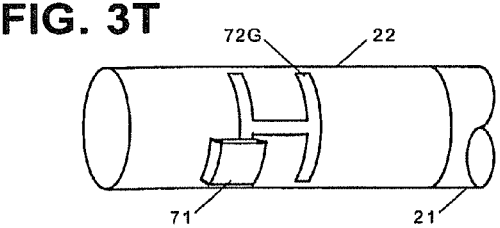

In one example of FIG. 3T, an input unit 71 is movably retained by a H-shaped guide 72G and moves therealong while generating different sensing signals, similar to that of FIG. 1D. As described therein, such an input unit 71 may generate different signals based upon its position or other dynamic patterns of different user inputs. It is appreciated in this example that movement paths of the input unit 71 are directly determined by the guide 72G. In a related example of FIG. 3U, another input unit 71 may be fixedly or releasably affixed to a guide 72G, where the second unit 22 may define on its surface a rectangular track 72 in which an assembly of the input unit 71 and guide 72G is movably retained. As the user supplies the user input, the assembly moves in response thereto while being retained inside the track 72. It is appreciated that the input unit 71 may move between any two states defined in such a two-dimensional track 72 along different paths. In another related example of FIG. 3V, an input unit 71 and second unit 22 are generally similar to those of FIG. 3U, except that its two-dimensional track 72 defines an oval shape. In another related example of FIG. 3W, an input unit 71 is retained inside an unidirectional track 72 and moves therealong. However, a distal part of such a second unit 22 may be arranged to move in at least two directions similar to those of FIGS. 3I to 3K. Therefore, the input unit 71 may generate different sensing signals. In yet another related example of FIG. 3X, an input unit 71 is also retained in an unidirectional track 72 but fixedly or releasably affixed to a guide 72G which in turn is arranged to move with respect to the second unit 22. Accordingly, such an input unit 71 may generate different sensing signals. Other characteristics of the input unit 71 of FIGS. 3T to 3X may be similar or identical to those of FIGS. 3I to 3S.

Figure 3X:
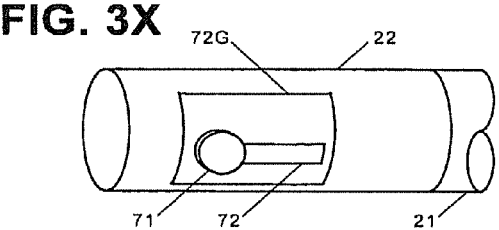

It is appreciated in FIGS. 3A to 3X that various input units 71 are shaped and/or sized such that the user may manipulate the input units 71 while grabbing or holding the second unit 22 whether the user grabs the second unit 22 with her or his thumb pointing proximally, distally, and/or laterally. More specifically, such input units 71 generate the sensing signals of which amplitudes, durations or other temporal and/or spatial patterns may be determined by various dynamic patterns of the user input for grabbing and holding the second unit 22. Accordingly, the user may control various features of pelvic relaxing operation while grabbing or holding the second unit 22 during use, without having to change the grip of the second unit 22, without having to move her or his hand to reach the input unit 71 while holding and grabbing the second unit 22, and the like.

In another aspect of the present invention, the control member may include sensor units which are incorporated into the first unit of the body member and monitor various user inputs supplied to the sensor units by the user through the pelvic structure. FIGS. 4A to 4H represent perspective views of exemplary sensor units for monitoring various user inputs according to the present invention. It is to be understood that each figure shows an exemplary first unit of a body member which is coupled to an exemplary second unit thereof. It is also appreciated and as described earlier that the above input units and sensor units basically refer to the same or similar articles capable of receiving various user inputs and generating various sensing signals in response thereto. Therefore, all the embodiments or features of the aforementioned input units also apply to various sensor units to be described in detail below. In addition, all of such input units may be disposed in the first unit of the body member of the system and utilized as the sensor units. As will be manifest from below, these sensor units offer the benefit of allowing the user to supply different user inputs to such sensor units without manipulating any part of the second unit (i.e., the grip unit) of the body member.

Figure 4A:
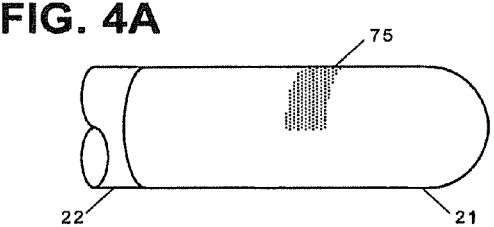
FIGS. 4A to 4H are perspective views of exemplary sensor units for monitoring various user inputs according to the present invention.

In one example of FIG. 4A, a sensor unit 75 is disposed around a circumference of a first unit 21 of the body member. The sensor unit 75 may be arranged to encompass an entire circumference or only a part thereof along a path which may be perpendicular to a longitudinal axis of the first unit 21 or at a preset angle thereto. When desirable, the sensor unit 75 may be disposed along only a part of the circumference, at an acute or obtuse angle with respect to the longitudinal axis. Multiple sensor units 75 may also be disposed along multiple circumferences at an uniform or different intervals and/or at various angles, and the like. In a related example of FIG. 4B, another sensor unit 75 is disposed on a surface of the first unit 51 of the body member along a direction parallel to the longitudinal axis of the first unit 21. The sensor unit 75 may be arranged to encompass an entire length from the head to the base of the first unit 21 or only a part thereof. When desirable, the sensor unit 75 may be disposed at a preset angle with respect to such an axis, wound along a helical path, and the like. Multiple sensor units 75 may also be disposed along multiple lengths of the first unit at an uniform or different intervals and/or at various angles, and the like.

Such sensor units 75 may be arranged to receive the user inputs through at least a portion of the pelvic structure, e.g., the clitoris, G spot, as well as other walls thereof. As described above, the sensor units 75 operate in the same mechanisms as the input units. Accordingly, the sensor units 75 may receive the user input, monitor various dynamic patterns of the user input, and generate various sensing signals in response to at least one of such dynamic patterns, where the control member may receive such sensing signals and then manipulate the actuator member to effect a specific movement of the single part or multiple parts of the first unit of the body member. In one example, the sensor unit 75 may generate the sensing signals in response an amplitude of force of the user input, its direction, its duration, its position of application, and other temporal and/or spatial patterns thereof. In another example, the sensor unit 75 may generate the sensing signals in response an amplitude of movement of the sensor unit 75 effected by the user input, a direction of such movement, its duration, and other temporal and/or spatial patterns thereof. In another example, the sensor unit 75 may also generate the sensing signals in response a duration of contact with the user, its direction, its duration, its position of contact, and other temporal and/or spatial patterns thereof. In yet another example, the sensor unit 75 may generate the sensing signals in response to a depth of insertion of the first unit 21 through the opening of the pelvic structure, a duration of such insertion, its direction, and other temporal and/or spatial patterns thereof. Similar to the input unit, the sensor unit may monitor various dynamic patterns of the user input by effecting movement or deformation thereof or, in the alternative, without effecting any of such. Depending upon their physical dispositions and/or mechanisms of operation, the sensor unit 75 may be arranged to receive the user inputs through various parts of the pelvic structure. For example, FIGS. 4E and 4F describe sensor units designed for receiving the user inputs through the G spot, while FIGS. 4G and 4H exemplify sensor units designed for receiving the user inputs through the clitoris. Although not included, the sensor units 75 may receive the user inputs through other portions of the pelvic structure as well.

Figure 4E:
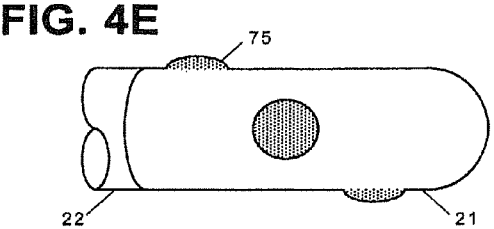
Figure 4B:
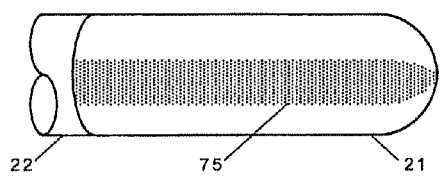
Figure 4F:
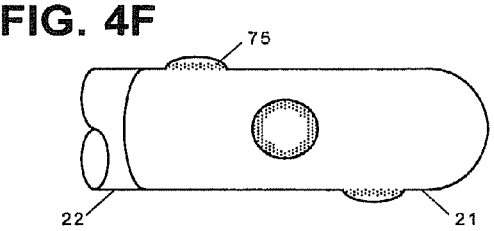
Figure 4C:
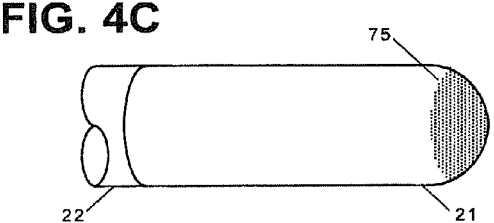

In another example of FIG. 4C, a sensor unit 75 may preferentially be disposed on (or around) the distal end of the first unit 21 or the head thereof. Accordingly, the user may deliver the user input thereto by inserting the sensor unit 75 in the pelvic cavity, by abutting or contacting the sensor unit 75 against the pelvic structure, and the like. In a related example of FIG. 4D, a first unit 21 is comprised of two parts coupled to each other by a sensor unit 75 which is arranged to monitor a movement of one of such parts with respect to the other thereof (e.g., deflection thereof) and/or to monitor force of the user input preferentially applied to only one of such parts. In response to the movement and/or force, the sensor unit 75 may generate different sensing signals. Further characteristics of the sensor units 75 of FIGS. 4C and 4D are similar or identical to those of FIGS. 4A and 4B.

In another example of FIG. 4E, a sensor unit 75 may preferentially be disposed on (or around) one or multiple bulges defined on various parts of the first unit 21. Accordingly, the user may deliver the user input thereto by disposing the sensor unit 75 side the pelvic cavity, by abutting or contacting the sensor unit 75 against the pelvic structure, and the like. In a related example of FIG. 4F, a sensor unit 75 is disposed along an entire (or only a part) of a circumference of at least one of such bulges. Thus, the user may similarly supply the user input thereto. It is appreciated that these sensor units 75 may be specifically designed to receive the user input through the G spot or other walls of the pelvic structure. Further characteristics of the sensor units 75 of FIGS. 4E and 4F are similar or identical to those of FIGS. 4A to 4D.

Figure 4G:
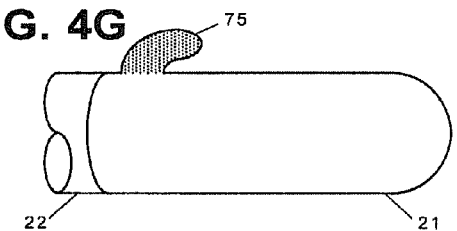
Figure 4D:
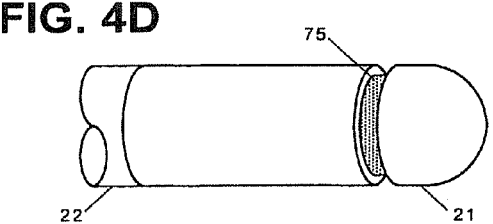
Figure 4H:
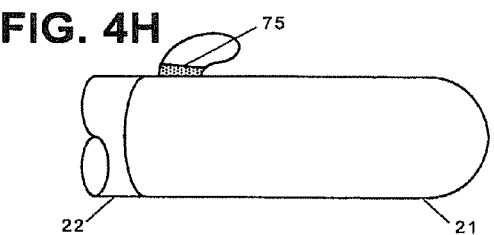

In another example of FIG. 4G, a sensor unit 75 may preferentially be disposed on (or around) a bulge which is defined in the trunk and/or base (or occasionally head) of the first unit 21 of the body member. Accordingly, the user may deliver the user input thereto by inserting the sensor unit 75 in the pelvic cavity, by abutting and/or contacting the sensor unit 75 against the pelvic structure such as the clitoris, and the like. In a related example of FIG. 4H, a bulge includes two parts coupled to each other by a sensor unit 75 which is arranged to monitor a movement of one of such parts with respect to the other thereof and/or to monitor force of the user input preferentially applied to only one of such parts. In response to the movement and/or force, the sensor unit 75 may generate different sensing signals. It is to be understood that these sensor units 75 may be specifically designed to receive the user input through the clitoris or other portions of the opening of the pelvic structure. Further characteristics of the sensor units 75 of FIGS. 4G and 4H are similar or identical to those of FIGS. 4A to 4F.

Configurational and/or operational variations and/or modifications of the above embodiments of the exemplary systems and various members thereof described in FIGS. 1A through 4F also fall within the scope of this invention.

As described above, a single part or multiple parts may be defined on the head, trunk, and/or base of the first unit of the body member and arranged to generate one or multiple movements which may effect stimulation of a single or multiple portions of the pelvic structure. At least one of the parts may be defined on the surface of the first unit so that the movement of the first unit may accompany the movement of such a part. Alternatively, at least one of the parts may be defined by the stimulator unit which is arranged to bulge a part of the first unit in contact therewith. In this embodiment, such a part may be defined by the movement of the stimulator unit or, more specifically, the position of such a stimulator unit. Thus, the movement of the first unit may not necessarily give rise to the movement of the part, for the stimulator unit may bulge another part of the first unit.

When the first unit defines multiple parts for contacting the portion of the pelvic structure, such parts may be arranged to be identical or different, to be disposed close to each other or spaced away from each other, to be distributed in an uniform or different intervals, and so on. As described above, at least one of such parts may be specifically designated to deliver various stimuli to the clitoris, to the G spot, and/or other strategic portions of the pelvic structure.

In general, the input unit is to be disposed in the second unit of the body member, whereas the sensor unit is to be disposed in its first unit. When desirable, the input member may be disposed in the first unit, while the sensor unit may be disposed in the second unit, and the like. The input and sensor units may generally receive the user input from the user whose the pelvic structure is to be stimulated by the system. When desirable, the system may instead be shaped and sized to allow a third party to control the system for the user or, conversely, to allow such an user to control the system to the third party. In addition, the system may be used to deliver various stimuli to other structures such as, e.g., a rectal structure, a prostate structure, a vaginal structure, and the like. The system may also include multiple input units, multiple sensor units, or both.

As described above, the input unit as well as the sensor unit may move or otherwise operate between at least two (or three) states. In general, such units may be arranged to generate different sensing signals in each of the states, although different units each in one of its states may generate similar or identical sensing signals. In addition, successive applications of the user input to one of the units may move or operate the unit to each of other states one at a time continuously or intermittently. As described hereinabove, the input and/or sensor units may receive the user input and generate the sensing signals without making any movement in response thereto. In the alternative, the input and/or sensor units may move in response to the user input while generating different sensing signals having desirable dynamic patterns which eventually effect one or multiple movements of one or multiple parts of the body member defining desirable dynamic features. Such movements of the input and/or sensor units may be vibration, translation, pivoting, rotation, swiveling, tapping, thumping, and the like, where the user input effecting such movements may be pressing, touching, pushing, squeezing, swiveling, rotating, pivoting, sliding, toggling, tapping, and the like.

The pelvic relaxing system of the present invention may further be construct to be waterproof. For example, various input units of the body member may be covered by a waterproof layer or may be disposed inside the second unit of the body member. In addition, the system may be arranged to run by a rechargeable battery which may be recharged by electromagnetic induction from outside.

Unless otherwise specified, various features of one embodiment of one aspect of the present invention may apply interchangeably to other embodiments of the same aspect of this invention and/or embodiments of one or more of other aspects of this invention. Accordingly, any input units described in FIGS. 3A to 3X may be used in any pelvic relaxing systems which may be capable of effecting one or more of the above movements of the single or multiple parts of the first unit of the body member. In addition, any input units described in FIGS. 3A to 3X may be applied to various systems exemplified in FIGS. 1A to 1D and/or mentioned throughout this invention. Moreover, any of the sensor units of FIGS. 4A to 4H may be applied to the systems of FIGS. 1A to 1D, may be used in conjunction with the input units of FIGS. 3A to 3X, and the like.

The above systems, methods, and/or processes of the present invention may be applied to or utilized for various purposes. As described above, such systems, methods, and/or processes may be used to provide various stimuli to various portions of the pelvic structure including the clitoris, G-spot, and other portions on the pelvic wall. In addition, the systems, methods, and/or processes may be applied to other pelvic relaxing systems described in the above co-pending applications regarding, e.g., systems with various clitoris stimulators, systems with various G-spot stimulators, systems with audio signal generators, systems with interactive capabilities, systems synchronized with internal and external signals, systems with electric stimulators, systems with adjustable body members, systems with retention mechanisms, systems with feedback mechanisms, systems having reciprocating body members, and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for providing tactile stimuli to at least a portion of a pelvic structure in response to a user input applied by a user while monitoring an amplitude of said user input, said method comprising the steps of:
providing a first part including at least one movable portion;
providing a second part capable of being held by said user; and
operatively coupling said first part to said second part for effecting at least one movement of said movable portion of said first part in response to said user input while manipulating at least one dynamic feature of said movement based on said user input.

2. The method of claim 1, wherein said effecting includes at least one of the steps of:
determining a temporal feature of said movement based on said amplitude; and
determining a spatial feature of said movement based on said amplitude.

3. The method of claim 2, wherein said determining said temporal feature includes at least one of the steps of:
determining a duration of said movement based thereon;
determining a frequency of said movement based thereon; and
determining a sequence of said movement based thereon.

4. The method of claim 2, wherein said determining said temporal feature includes at least one of the steps of:
determining an amplitude of said movement based thereon;
determining a direction of said movement based thereon; and
determining a type of said movement based thereon.

5. The method of claim 1, wherein said effecting includes the steps of:
monitoring an amplitude of said user input; and
performing said manipulating based on said amplitude.

6. The method of claim 1, wherein said effecting includes the steps of:
monitoring a displacement of said user input; and
performing said manipulating based on said displacement.

7. The method of claim 1, wherein said manipulating includes the steps of:
generating at least one default movement of said first part; and
superposing onto said default movement said movement of first part effected through said manipulating.

8. The method of claim 1, wherein said manipulating includes at least one of the steps of:
performing said manipulating based on said user input applied to said second part by a hand of said user;
performing said manipulating based on said user input applied to said second part by a body part of said user which is not said hand thereof; and
performing said manipulating based on said user input applied to said second part by an article manipulated by said user.

9. The method of claim 1, wherein said manipulating includes at least one of the steps of:
performing said manipulating based on at least one mechanical feature of said user input;
performing said manipulating based on at least one electrical feature of said user input;
performing said manipulating based on at least one optical feature of said user input; and
performing said manipulating based on at least one magnetic feature of said user input.

10. The method of claim 1, wherein said effecting at least one movement thereof includes at least one of the steps of:
vibrating said movable portion of said first part;
rotating said movable portion of said first part;
swiveling said movable portion of said first part;
translating said movable portion of said first part;
reciprocating said movable portion of said first part; and
deforming said movable portion of said first part.

11. A method for providing tactile stimuli to at least a portion of a pelvic structure in response to a user input applied by a hand of a user while monitoring at least one of a temporal feature and a spatial feature of said user input, said method comprising the steps of:
forming a body member by attaching a first part of said body member to a second part of said body member, wherein said first part includes at least one movable portion receives said user input;
incorporating at least one actuator member into said second part; and
manipulating said actuator member for effecting at least one movement of said movable portion of said first part of said body member in response to said at least one of said features of said user input and also for manipulating at least one dynamic feature of said movement based on said at least one of said features of said user input.

12. The method of claim 11, wherein said effecting includes at least one of the steps of:
determining a temporal feature of said movement based on said at least one of said features of said user input; and
determining a spatial feature of said movement based on said at least one of said features of said user input.

13. The method of claim 12, wherein said determining said temporal feature includes at least one of the steps of:
determining a duration of said movement based thereon;
determining a frequency of said movement based thereon; and
determining a sequence of said movement based thereon.

14. The method of claim 12, wherein said determining said temporal feature includes at least one of the steps of:
determining an amplitude of said movement based thereon;
determining a direction of said movement based thereon; and
determining a type of said movement based thereon.

15. The method of claim 11, wherein said effecting includes the steps of:
monitoring an amplitude of said user input; and
performing said manipulating based on said amplitude.

16. The method of claim 11, wherein said effecting includes the steps of:
monitoring a displacement of said user input; and
performing said manipulating based on an amplitude of said displacement.

17. A method for providing tactile stimuli to a pelvic structure in response to a user input applied by a user while monitoring at least one of a temporal feature of said user input and a spatial feature of said user input, said method comprising the steps of:
providing a first part including at least one movable portion and capable of receiving said user input;
providing a second part capable of being held by said user; and
operatively coupling said first part to said second part for effecting at least one movement of said movable portion based on said at least one of said features of said user input as well as for manipulating at least one dynamic feature of said movement based on said at least one of said features of said user input.

18. The method of claim 17, wherein said effecting includes at least one of the steps of:
determining a temporal feature of said movement based on said at least one of said features of said user input; and
determining a spatial feature of said movement based on said at least one of said features of said user input.

19. The method of claim 17, wherein said determining said temporal feature includes at least one of the steps of:
determining a duration of said movement based thereon;
determining a frequency of said movement based thereon; and
determining a sequence of said movement based thereon.

20. The method of claim 17, wherein said determining said temporal feature includes at least one of the steps of:
determining an amplitude of said movement based thereon;
determining a direction of said movement based thereon; and
determining a type of said movement based thereon.

21. The method of claim 17, wherein said effecting includes the steps of:
monitoring an amplitude of said user input; and
performing said manipulating based on said amplitude.

22. The method of claim 17, wherein said effecting includes the steps of:
monitoring a displacement of said user input; and
performing said manipulating based on an amplitude of said displacement.

* * * * *